United States Patent
Jung et al.

(10) Patent No.: US 12,307,980 B2
(45) Date of Patent: May 20, 2025

(54) DISPLAY DEVICE

(71) Applicant: Samsung Display Co., LTD., Yongin-si (KR)

(72) Inventors: Hae Goo Jung, Yongin-si (KR); Hwanwoo Lee, Yongin-si (KR); Yeon-Shil Jung, Yongin-si (KR); Yeonji Bae, Yongin-si (KR); Junhyun Lee, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/538,124

(22) Filed: Dec. 13, 2023

(65) Prior Publication Data
US 2024/0242681 A1   Jul. 18, 2024

(30) Foreign Application Priority Data
Jan. 17, 2023   (KR) .................. 10-2023-0006726

(51) Int. Cl.
*G09G 3/3275* (2016.01)
*G06F 3/041* (2006.01)

(52) U.S. Cl.
CPC ......... *G09G 3/3275* (2013.01); *G06F 3/0412* (2013.01); *G09G 2300/0413* (2013.01); *G09G 2300/0426* (2013.01); *G09G 2330/12* (2013.01)

(58) Field of Classification Search
CPC ................................................. G06F 1/1652
See application file for complete search history.

(56) References Cited

U.S. PATENT DOCUMENTS

| | | | | |
|---|---|---|---|---|
| 2002/0044246 | A1* | 4/2002 | Moon | G02F 1/1345 349/139 |
| 2015/0062510 | A1* | 3/2015 | Chang | G02F 1/133345 349/110 |
| 2015/0312562 | A1* | 10/2015 | Kim | G09G 3/20 348/59 |
| 2017/0090650 | A1* | 3/2017 | Jin | H05K 1/0215 |
| 2018/0033355 | A1* | 2/2018 | Lee | G09G 3/006 |
| 2018/0157132 | A1* | 6/2018 | Shim | G02F 1/133512 |
| 2019/0013373 | A1* | 1/2019 | Lee | H10K 59/131 |
| 2021/0134921 | A1 | 5/2021 | Zeng et al. | |
| 2022/0028956 | A1* | 1/2022 | You | H10K 59/124 |

FOREIGN PATENT DOCUMENTS

| | | |
|---|---|---|
| KR | 100685841 B1 | 2/2007 |
| KR | 101813749 B1 | 1/2018 |
| KR | 1020190052327 | 5/2019 |
| KR | 1020190141481 | 12/2019 |

\* cited by examiner

*Primary Examiner* — Nan-Ying Yang
(74) *Attorney, Agent, or Firm* — CANTOR COLBURN LLP

(57) ABSTRACT

A display device includes: a substrate including a display area in which pixels are disposed and a non-display area; a common voltage transfer line disposed in the non-display area and transferring a common voltage to the pixels; a data output wire disposed at the non-display area and connected to a data line which transfers a data voltage to the pixels; and a sacrificial wire disposed between the common voltage transfer line and the data output wire and not connected to the data line.

15 Claims, 18 Drawing Sheets

DISPLAY DEVICE

This application claims priority to Korean Patent Application No. 10-2023-0006726, filed on Jan. 17, 2023, and all the benefits accruing therefrom under 35 U.S.C. § 119, the content of which in its entirety is herein incorporated by reference.

BACKGROUND

(a) Field

This disclosure relates to a display device.

(b) Description of the Related Art

A display device is a device that displays an image, and includes a liquid crystal display ("LCD"), an organic light-emitting diode ("OLED"), a quantum dot light-emitting diode ("QLED"), a micro LED display, or the like.

In various display devices including the organic light-emitting diode, moisture permeation or the like may occur depending on a use environment. This may cause corrosion of a wire so that there is a problem in which reliability of the display device is deteriorated. Accordingly, the display device having improved environmental reliability is desired.

SUMMARY

Embodiments provide a display device with improved long-term reliability by preventing a damage to wires. The embodiments are to prevent or delay corrosion of wires disposed in a peripheral region of the display device and reduce a degree of the corrosion.

Specifically, when moisture permeation occurs in the display device, corrosion due to a potential difference between two adjacent metals (e.g., galvanic corrosion) may occur. The embodiments are to delay or prevent corrosion due to a potential difference between adjacent wires.

A display device in an embodiment includes: a substrate including a display area in which pixels are disposed and a non-display area: a common voltage transfer line which is disposed in the non-display area and transfers a common voltage to the pixels; a data output wire disposed in the non-display area and connected to a data line which transfers a data voltage to the pixels: and a sacrificial wire disposed between the common voltage transfer line and the data output wire and not connected to the data line.

In an embodiment, the display device may further include a data driver disposed in the non-display area. The data driver may include: a first terminal which outputs the data voltage: and a sacrificial terminal which applies a predetermined voltage to the sacrificial wire.

In an embodiment, the sacrificial terminal may apply a voltage that is higher than the common voltage and is lower than or equal to the data voltage.

In an embodiment, the non-display area may include a bending area. The data output wire may include a first portion extending from the data driver toward the bending area, a second portion connected to the first portion and passing through the bending area, a third portion connected to the second portion and extending toward the display area, and a data contact portion electrically connecting the second portion and the third portion.

In an embodiment, a first end of the sacrificial wire may be connected to the sacrificial terminal, a second end of the sacrificial wire may include a sacrificial contact portion. The sacrificial contact portion may include a dummy wire overlapping the second end of the sacrificial wire and a dummy connection electrode connecting the second end of the sacrificial wire and the dummy wire.

In an embodiment, the sacrificial wire may extend from the sacrificial terminal toward the bending area, and may be bent toward the data output wire to shield the data contact portion.

In an embodiment, the sacrificial wire may be bent at least once.

In an embodiment, the sacrificial wire may be disposed in a same layer as the common voltage transfer line, or an organic layer may be disposed between the sacrificial wire and the common voltage transfer line.

In an embodiment, a display device in another embodiment includes: a substrate including a display area in which pixels are disposed and a non-display area: a common voltage transfer line which is disposed in the non-display area and transfers a common voltage to the pixels: a data output wire disposed in the non-display area and connected to a data line which transfers a data voltage to the pixels: a pad portion disposed in the non-display area and including a first terminal which outputs the common voltage and a second terminal which outputs a voltage higher than the common voltage: and a sacrificial wire disposed between the common voltage transfer line and the data output wire, connected to the pad portion, and not connected to the data line.

In an embodiment, the display device may further include a high potential wire extending from the second terminal and connected to the sacrificial wire. The second terminal may output at least one of a gate high voltage, a driving voltage, and a ground voltage to the high potential wire.

In an embodiment, the display device may further include a data driver disposed in the non-display area. The non-display area may include a bending area. The data output wire may include a first portion extending from the data driver toward the bending area, a second portion connected to the first portion and passing through the bending area, a third portion connected to the second portion and extending toward the display area, and a data contact portion electrically connecting the second portion and the third portion. The sacrificial wire may extend toward the bending area and may be bent toward the data output wire to shield the data contact portion.

In an embodiment, the sacrificial wire may include a shape bent at least once.

In an embodiment, the sacrificial wire may be disposed in a same layer as the common voltage transfer line, or an organic layer may be disposed between the sacrificial wire and the common voltage transfer line.

In an embodiment, a display device in another embodiment may include: a substrate including a display area in which pixels are disposed and a non-display area: a common voltage transfer line which is disposed in the non-display area and transfers a common voltage to the pixels: a data output wire disposed in the non-display area and connected to a data line which transfers a data voltage to the pixels: a crack detection line which is disposed in the non-display area and transfers a crack detection voltage: and a sacrificial wire disposed between the common voltage transfer line and the data output wire, connected to the crack detection line, and not connected to the data line.

In an embodiment, the display device may further include a data driver disposed in the non-display area. The non-display area may include a bending area. The data output wire may include a first portion extending from the data driver toward the bending area, a second portion connected to the first portion and passing through the bending area, a third portion connected to the second portion and extending toward the display area, and a data contact portion electrically connecting the second portion and the third portion. The sacrificial wire may extend from the crack detection line toward the bending area and may be bent toward the data output wire to shield the data contact portion.

In an embodiment, the sacrificial wire may be bent at least once.

In an embodiment, the sacrificial wire may be disposed in a same layer as the common voltage transfer line, or an organic layer may be disposed between the sacrificial wire and the common voltage transfer line.

A display device in another embodiment of the disclosure includes: a substrate including a display area in which pixels are disposed in a non-display area: a common voltage transfer line which is disposed at the non-display area and transfers a common voltage to the pixels: a data output wire disposed in the non-display area and connected to a data line which transfers a data voltage to the pixels: touch wires disposed in the non-display area and including a ground wire: and a sacrificial wire connected to the ground wire and not connected to the data line. The ground wire extends parallel to a touch wire of the touch wires adjacent to the ground wire and is not connected to a touch sensor disposed in the display area.

In an embodiment, the display device may further include a data driver disposed in the non-display area. The non-display area may include a bending area. The data output wire may include a first portion extending from the data driver toward the bending area, a second portion connected to the first portion and passing through the bending area, a third portion connected to the second portion and extending toward the display area, and a data contact portion electrically connecting the second portion and the third portion. A first end of the sacrificial wire may be connected to the ground wire, and a second end of the sacrificial wire may shield the data contact portion.

In an embodiment, the sacrificial wire may be disposed in a same layer as the common voltage transfer line, or an organic layer may be disposed between the sacrificial wire and the common voltage transfer line.

By the embodiments, corrosion due to a potential difference between adjacent wires may be delayed or prevented. Accordingly, it is possible to provide a display device with improved environmental reliability. According to the embodiment, a sacrificial wire may be disposed between adjacent wires where a potential difference occurs to delay corrosion of the wire and reduce a degree of the corrosion.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
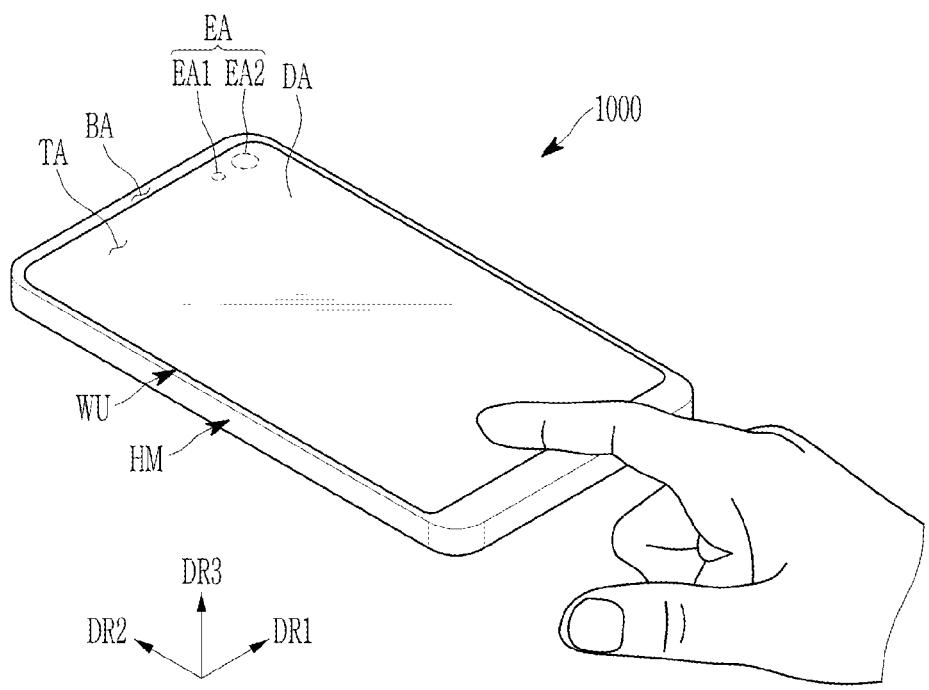
FIG. 1 is a schematic perspective view illustrating an embodiment of a use state of a display device.

The disclosure will be described more fully hereinafter with reference to the accompanying drawings, in which embodiments of the disclosure are shown. As those skilled in the art would realize, the described embodiments may be modified in various different ways, all without departing from the spirit or scope of the disclosure.

In order to clearly describe the disclosure, parts or portions that are irrelevant to the description are omitted, and identical or similar constituent elements throughout the specification are denoted by the same reference numerals.

Further, in the drawings, the size and thickness of each element are arbitrarily illustrated for ease of description, and the disclosure is not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means positioned or disposed on or below the object portion, and does not necessarily mean positioned or disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "in a cross-section" means viewing a cross-section formed by vertically cutting a target portion from the side.

In addition, throughout the specification, "connected" does not only mean when two or more elements are directly connected, but when two or more elements are indirectly connected through other elements, and when they are physically connected or electrically connected, and further, it may be referred to by different names depending on a position or function, and also may be referred to as a case in which respective parts that are substantially integrated are linked to each other.

In addition, throughout the specification, when it is said that an element such as a wire, layer, film, region, area, substrate, plate, or constituent element "is extended (or extends) in a first direction or second direction", this does not mean only a straight shape extending straight in the corresponding direction, but may mean a structure that substantially extends in the first direction or the second direction, is partially bent, has a zigzag structure, or extends while having a curved structure.

In the drawings, signs "DR1", "DR2" and "DR3" are used to indicate directions, where "DR1" is a first direction, "DR2" is a second direction that is perpendicular to the first direction, and "DR3" is a third direction that is perpendicular to the first direction and the second direction. In addition, overlapping of two components means that the two components overlap in the third direction (DR3) (e.g., in a direction perpendicular to an upper surface of a substrate) unless otherwise specified.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a schematic structure of a display device will be described through FIGS. 1 to 3.

Figure 2:
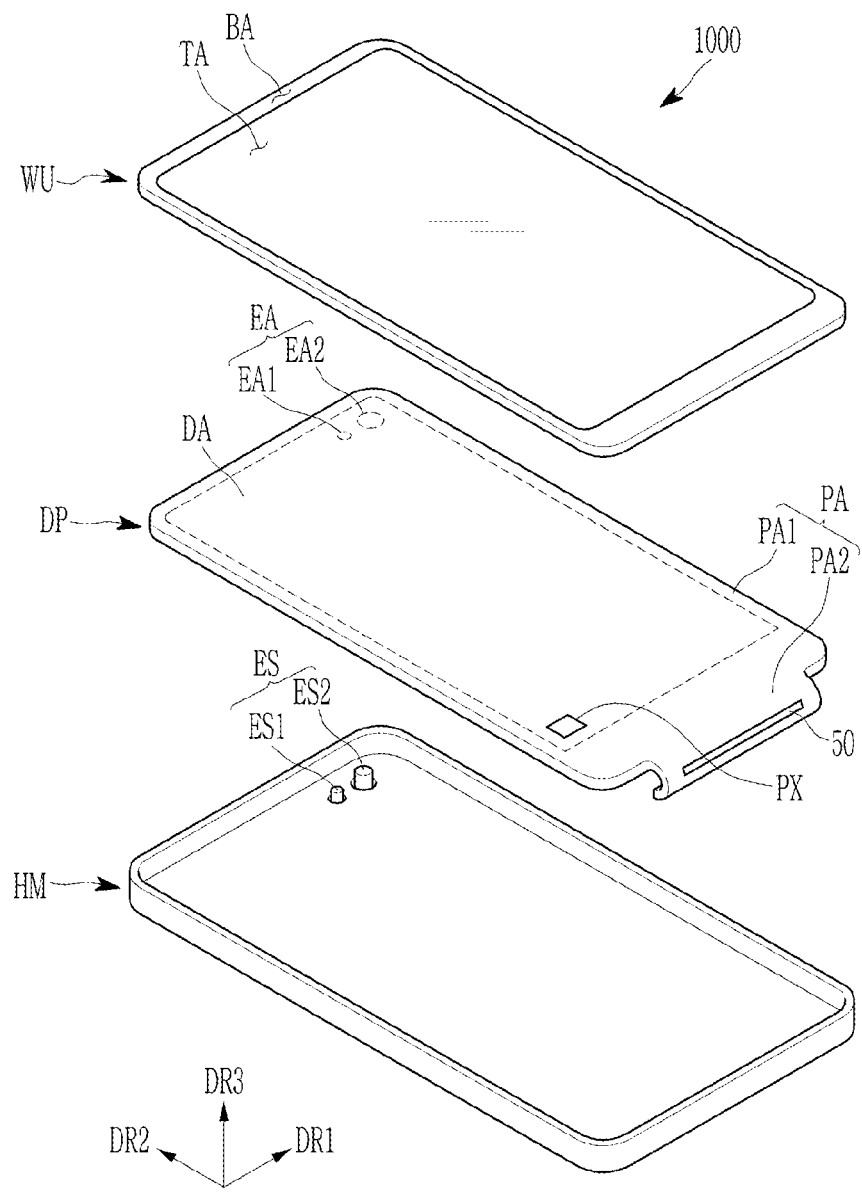
FIG. 2 is an exploded perspective view of an embodiment of the display device.
Figure 3:
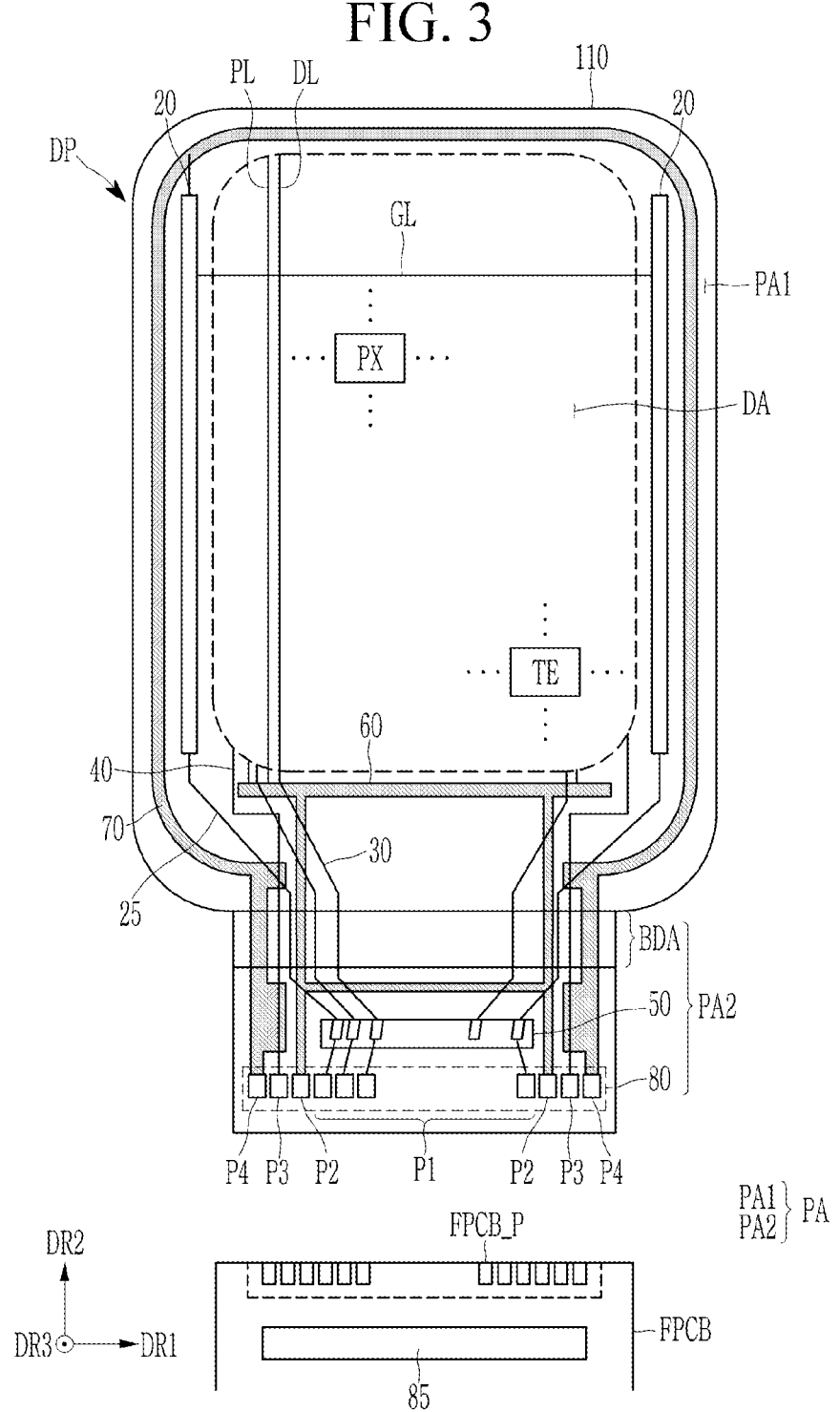
FIG. 3 is a schematic plan view of an embodiment of a wire of a display panel.

FIG. 1 is a schematic perspective view illustrating an embodiment of a use state of the display device, FIG. 2 is an exploded perspective view of an embodiment of the display device, and FIG. 3 is a schematic plan view of a wire of a display panel.

Referring to FIG. 1, the display device 1000 in the embodiment may display a moving image or a still image. The display device 1000 may be used for a display screen for a portable electronic device such as a mobile phone, a smart phone, a tablet personal computer ("PC"), a mobile communication terminal, an electronic note, an electronic book, a portable multimedia player ("PMP"), a navigation device, an ultra-mobile PC ("UMPC"), or the like, and various products such as a television, a laptop computer, a monitor, a billboard, the Internet of things ("IoT"), or the like. In addition, the display device 1000 in the embodiment may be used in a wearable device such as a smart watch, a watch phone, a glass-type display, and a head mounted display ("HMD"). FIG. 1 illustrates that the display device 1000 is used as a smart phone, for convenience of description.

The display device 1000 may display an image in a third direction DR3 at a display surface parallel to a first direction DR1 and a second direction DR2. The display surface on which the image is displayed may correspond to a front surface of the display device 1000, and may correspond to a front surface of a cover window WU.

In the illustrated embodiment, a front surface (or an upper surface) and a rear surface (or a lower surface) of each member are defined based on a direction in which the image is displayed. The front surface and the rear surface may be opposed to each other in the third direction DR3, and a normal direction of each of the front surface and the rear surface may be parallel to the third direction DR3. A separation distance between the front surface and the rear surface in the third direction DR3 may correspond to a thickness of a display panel in the third direction DR3.

The display device 1000 in the embodiment may detect an input of a user applied from the outside. The user's input may include various types of external inputs such as a portion of the user's body, light, heat, pressure, or the like. The user's input may be provided in various forms.

Referring to FIGS. 1 and 2, the display device 1000 may include the cover window WU, a housing HM, a display panel DP, and an optical element ES. In an embodiment, the cover window WU and the housing HM may be coupled to form an appearance of the display device 1000.

The cover window WU may include an insulating panel. In an embodiment, the cover window WU may include or consist of glass, plastic, or any combinations thereof, for example. A front surface of the cover window WU may define the front surface of the display device 1000. A transmission area TA may be an optically transparent area.

A blocking area BA may define a shape of the transmission area TA. The blocking area BA may be adjacent to the transmission area TA and may surround the transmission area TA. The blocking area BA may be an area having relatively low light transmittance compared to the transmission area TA. The blocking area BA may include an opaque material that blocks light. The blocking area BA may have a predetermined color.

The display panel DP may include the display area DA and a non-display area PA around the display area DA. The display area DA may be an area in which a pixel operates according to an electrical signal to emit light. The display panel DP may include a touch sensor layer capable of sensing a touch. In an embodiment, the display area DA may be an area in which an image is displayed by including the pixel, and may be an area in which an external input is sensed by touch sensors TE disposed above the pixel in the third direction DR3.

Light-emitting elements and pixel circuit portions generating and transferring a light-emitting current to each of the light-emitting elements may be formed at the display area DA. In an embodiment, one light-emitting element and one pixel circuit portion are also referred to as a pixel PX, for example. The pixel PX may be defined as a minimum unit emitting light.

The display area DA may include a component area EA, and specifically, may include a first component area EA1 and a second component area EA2. The first component area EA1 and the second component area EA2 are illustrated as being spaced apart from each other, but at least a portion of the first component area may be connected to at least a portion of the second component area. The first component area EA1 or the second component area EA2 may be an area in which a component using infrared light, visible light, sound, or the like is disposed therebelow.

The optical element ES may be disposed below the display panel DP. The optical element ES may include a first optical element ES1 overlapping the first component area EA1 and a second optical element ES2 overlapping the second component area EA2.

The first optical element ES1 may be an electronic element using light or sound. In an embodiment, the first optical element ES1 may be a sensor (e.g., an infrared sensor) that receives and uses light, a sensor that outputs and senses light or sound to measure a distance or that recognizes a fingerprint or the like, a small lamp that outputs light, a speaker that outputs sound, or the like, for example. The electronic element using light may use light of various wavelength bands such as visible light, infrared light, ultraviolet light, or the like. The second optical element ES2 may be at least one of a camera, an infrared camera, a dot projector, an infrared illuminator, and a time-of-light sensor.

The non-display area PA of the display panel DP may at least partially overlap the blocking area BA of the cover window WU. The non-display area PA may be an area covered by the blocking area BA. The non-display area PA may be adjacent to the display area DA and may surround the display area DA. An image may not be displayed at the non-display area PA, and a driving circuit portion, a driving wire, or the like for driving the display area DA may be disposed. The non-display area PA may include a first peripheral area PA1 disposed outside the display area DA, and a second peripheral area PA2 including a data driver 50, a connection wire, and a bending area. In an embodiment, as shown in FIG. 2, the first peripheral area PA1 may be disposed at third sides of the display area DA, and the second peripheral area PA2 may be disposed at a remaining side of the display area DA, for example.

The second peripheral area PA2 may include the bending area BDA of FIG. 3. The display area DA and the first peripheral area PA1 may have a flat state that is substantially parallel to a plane defined by the first direction DR1 and the second direction DR2, and one side of the second peripheral area PA2 may extend from a flat state to have a flat state again after passing through the bending area. At least a portion of the second peripheral area PA2 may be bent and assembled to be disposed at a rear surface of the display area DA. In an embodiment, the second peripheral area PA2 may not be bent.

The data driver 50 may be disposed on the second peripheral area PA2, and may be disposed on a bending portion or may be disposed at one of opposite sides of the bending portion. The data driver 50 may be provided in a form of a chip.

The data driver 50 may be electrically connected to the display area DA to transfer an electrical signal to the display area DA. In an embodiment, the data driver 50 may provide data signals to pixels PX disposed in the display area DA, for example. The data driver 50 may include various circuits or may be designed to provide various electrical signals to the display area DA.

Referring to FIG. 3, a pad portion 80 of FIG. 3 may be disposed at an end of the second peripheral area PA2 of the display device 1000, and the pad portion may be electrically connected to a flexible printed circuit board FPCB including a controller 85. The controller 85 disposed at the flexible printed circuit board may include various driving circuits for driving the display device 1000, connectors for power supply, or the like. In an embodiment, the controller may include a touch driver, and may be electrically connected to the touch sensors TE disposed in the display area DA through a touch wire, for example. The controller 85 may be provided as an integrated circuit chip disposed (e.g., mounted) on the flexible printed circuit board FPCB. The touch driver may be disposed (e.g., mounted) as a separate driving chip. In an embodiment, a rigid printed circuit board ("PCB") may be used instead of the flexible printed circuit board.

Referring to FIG. 3, the display panel DP may include a substrate 110 including the display area DA and the non-display area PA. The non-display area PA may include the first peripheral area PA1 surrounding at least a portion of the display area DA and the second peripheral area PA2 disposed below the display area DA.

The display panel DP includes pixels PX. The pixels PX may be disposed within the display area DA. Each of the pixels PX includes a light-emitting element and a pixel circuit portion connected to the light-emitting element. In an embodiment, each pixel PX may emit red, green, blue, or white light, and may include, e.g., an organic light-emitting diode, for example.

The display panel DP may include signal lines and a pad portion. The signal lines may include a gate line GL, a data line DL, a driving voltage line PL, a driving voltage transfer line 60, a common voltage transfer line 70, or the like.

The gate line GL may extend across the display area DA in the first direction DR1, and may be spaced apart from each other in the second direction DR2 crossing the first direction DR1. The gate line GL may be connected to a gate driver 20 to receive a gate signal.

The data line DL and the driving voltage line PL may extend across the display area DA in the second direction DR2, and may be spaced apart from each other in the first direction DR1. The data line DL may be connected to the data driver 50 to receive a data signal.

The driving voltage transfer line 60 may be disposed in the non-display area PA. The driving voltage transfer line 60 may be connected to driving voltage lines PL, and may transfer a driving voltage.

The common voltage transfer line 70 may be disposed in the non-display area PA. The common voltage transfer line 70 may be disposed to surround the display area DA. The common voltage transfer line 70 may transfer a common voltage to an electrode of a light-emitting element constituting the pixel PX.

The gate driver 20 may be disposed at opposite sides of the display area DA in the first direction DR1. The gate driver 20 may generate a gate signal to transfer the generated gate signal to the pixel PX through the gate line GL. The pixel PX may receive gate signals from two gate drivers 20 disposed at opposite sides.

The data driver 50 may be disposed at one side of the display panel DP, and may be disposed in the second peripheral area PA2, for example. The data driver 50 may generate a data voltage to be applied to each pixel PX to transfer the generated data voltage to each data line DL.

The bending area BDA, the data driver 50, and the pad portion 80 may be disposed in the second peripheral area PA2 of the non-display area PA.

The bending area BDA may extend across the display panel DP in the first direction DR1 in the second peripheral area PA2. The bending area BDA may be an area between the display area DA and the data driver 50. The bending area BDA may be an area that is bendable or in a bent state. A portion that is bent at the bending area BDA to be disposed outside the bending area BDA may be bent toward a rear side of the display panel DP so that the bent portion is not visible from a front side. Wires may pass through the bending area BDA, and the plurality of wires may extend generally in the second direction DR2 from the bending area BDA.

The pad portion 80 may be disposed at one edge of the display panel DP, and may be disposed outside the bending area BDA. That is, the bending area BDA may be disposed between the display area DA and the pad portion 80.

The pad portion 80 may include terminals P1, P2, P3, and P4 that may be disposed along the first direction DR1. The terminals P1, P2, P3, and P4 may be electrically connected to terminals FPCB_P of the flexible printed circuit board FPCB. The flexible printed circuit board FPCB may transfer a signal or power of the controller 85 to the display panel DP through the terminals P1, P2, P3, and P4 of the pad port 80.

The controller 85 changes image signals transferred from the outside to image data signals, and transfers the changed signals to the data driver 50 through the terminal P1. In addition, the controller 85 may receive a vertical synchronization signal, a horizontal synchronization signal, and a clock signal to generate control signals for controlling driving of the gate driver 20 and the data driver 50. The generated control signals may be transferred to the gate driver 20 and the data driver 50 through terminals P1. The controller 85 transfers a driving voltage to the driving voltage transfer line 60 through the terminal P2. In addition, the controller 85 may transfer a common voltage to each of the common voltage transfer lines 70 through the terminal P4. The controller 85 may transfer a touch driving signal to a touch wire 40 through the terminal P3.

Data output wires 30 and a control line 25 may be disposed in the non-display area PA. The data output wires 30 may extend from the data driver 50 to the display area DA. The data output wires 30 may supply data voltages received from the data driver 50 to the data lines DL. The gate control line 25 may extend from the data driver 50 to the gate driver 20. The gate control line 25 may supply a gate control signal received from the data driver 50 to the gate driver 20.

The driving voltage transfer line 60 is disposed on the non-display area PA. In an embodiment, the driving voltage transfer line 60 may be disposed between the data driver 50 and the display area DA, for example. The driving voltage transfer line 60 provides a driving voltage to the pixels PX. In an embodiment, the driving voltage transfer line 60 may be disposed in the first direction DR1, and may be connected to driving voltage lines PL disposed in the second direction DR2, for example.

The common voltage transfer line 70 is disposed on the non-display area PA. The common voltage transfer line 70 may have a shape surrounding a substrate (SUB). The common voltage transfer line 70 may transfer a common voltage to one electrode (e.g., a cathode) of the light-emitting element included in the pixel PX.

Figure 4:
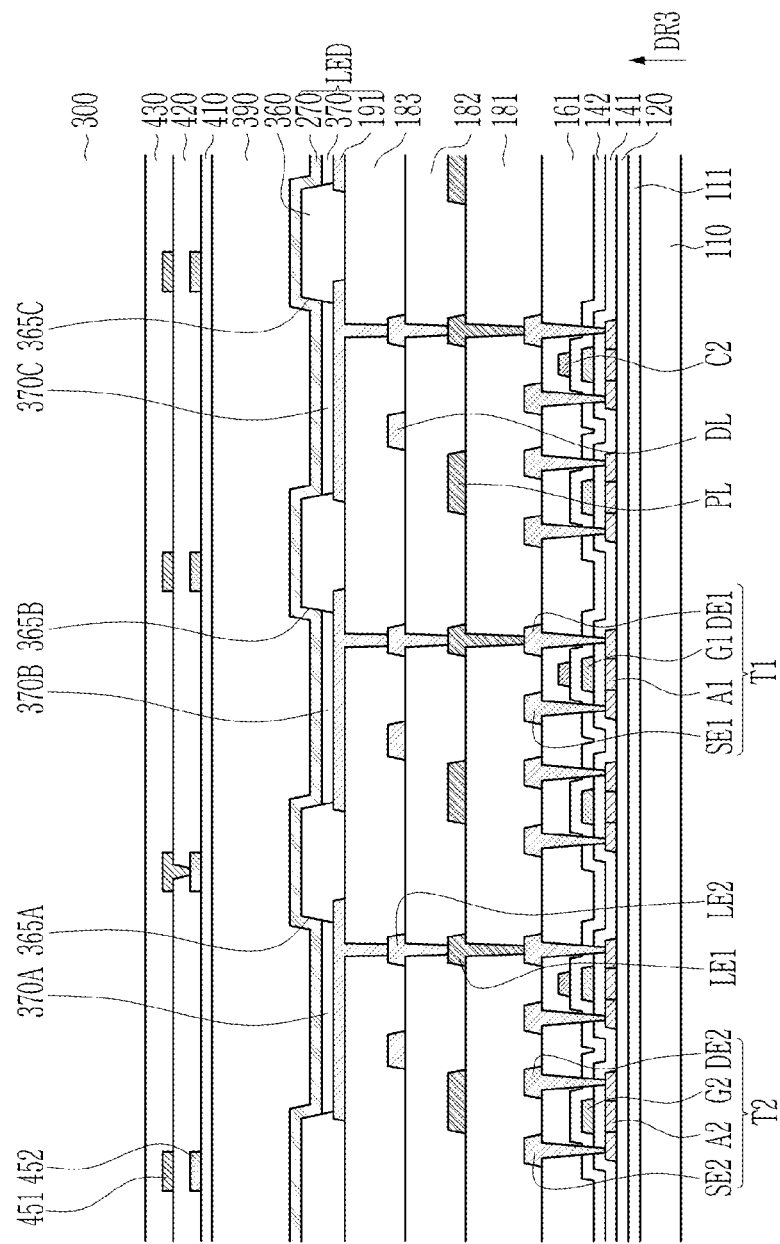
FIG. 4 is a schematic cross-sectional view of an embodiment of a display area of the display panel.

FIG. 4 is a schematic cross-sectional view of the display area of the display panel. A portion shown in FIG. 4 may correspond to approximately three pixel regions in the display area DA.

The display panel may basically include the substrate 110, first and second transistors T1 and T2 formed above the substrate 110, and a light-emitting element (or a light-emitting device) LED connected to the first transistor T1. The light-emitting element LED may correspond to the pixel PX.

The substrate 110 may be a flexible substrate including a polymer such as polyimide, polyamide, polyethylene terephthalate, or the like. The substrate 110 may also be a glass substrate.

A barrier layer 111 may be disposed on the substrate 110 to prevent penetration of moisture, oxygen, or the like. The barrier layer 111 may include an inorganic insulating material such as a silicon nitride ($SiN_x$), a silicon oxide ($SiO_x$), a silicon oxynitride ($SiO_xN_y$), or the like, and may have a single layer or multiple layers.

A buffer layer 120 may be disposed on the barrier layer 111. The buffer layer 120 may improve a characteristic of a semiconductor layer by blocking an impurity from the substrate 110 during formation of the semiconductor layer, and may relieve stress of the semiconductor layer by planarizing a surface of the substrate 110. The buffer layer 120 may include an inorganic insulating material such as a silicon oxide, a silicon nitride, a silicon oxynitride, or the like. The buffer layer 120 may also include amorphous silicon.

Semiconductor layers A1 and A2 may be disposed on the buffer layer 120. The semiconductor layers A1 and A2 may include a first region, a second region, and a channel region between the first region and the second region.

A first gate insulating layer 141 may be disposed on the semiconductor layers A1 and A2. The first gate insulating layer 141 may include an inorganic insulating material such as a silicon nitride ($SiN_x$), a silicon oxide ($SiO_x$), a silicon oxynitride ($SiO_xN_y$), or the like, and may have a single layer or multiple layers.

A first gate conductive layer including gate electrodes G1, G2, or the like may be disposed on the first gate insulating layer 141. Each component of the first gate conductive layer may include or consist of the same material in the same process. The first gate conductive layer may include a metal such as molybdenum (Mo), aluminum (Al), copper (Cu), titanium (Ti), or the like, or a metal alloy, and may be a single layer or multiple layers.

A second gate insulating layer 142 may be disposed on the first gate conductive layer. The second gate insulating layer 142 may include an inorganic insulating material such as a silicon nitride, a silicon oxide, a silicon oxynitride, or the like, and may have a single layer or multiple layers.

A second gate conductive layer that may include an upper electrode C2 of a storage capacitor or the like may be disposed on the second gate insulating layer 142. The upper electrode C2 may overlap a gate electrode G1, and the upper electrode C2, the gate electrode G1, and the second gate insulating layer 142 between the upper electrode C2 and the gate electrode G1 may constitute the storage capacitor. Each component of the second gate conductive layer may include or consist of the same material in the same process. The second gate conductive layer may include a metal such as molybdenum (Mo), aluminum (Al), copper (Cu), titanium (Ti), or the like, or a metal alloy, and may be a single layer or multiple layers.

A first inter-insulating layer 161 may be disposed on the second gate conductive layer. The first inter-insulating layer 161 may include an inorganic insulating material such as a silicon nitride, a silicon oxide, a silicon oxynitride, or the like, and may have a single layer or multiple layers. When the first inter-insulating layer 161 is a multilayer, a lower layer may include a silicon nitride and an upper layer may include a silicon oxide.

A first data conductive layer that includes first electrodes SE1 and SE2 and second electrodes DE1 and DE2 may be disposed on the first inter-insulating layer 161. The first electrode SE1 and the second electrode DE1 may be respectively connected to the first and second regions of the semiconductor layer A1 through contact holes defined in the insulating layers 141, 142, and 161. One of the first electrode SE1 and the second electrode DE1 may be a source electrode and the other of the first electrode SE1 and the second electrode DE1 may be a drain electrode. The first electrode SE2 and the second electrode DE2 may be respectively connected to the first and second regions of the semiconductor layer A2 through contact holes defined in the insulating layers 141, 142, and 161. One of the first electrode SE2 and the second electrode DE2 may be a source electrode and the other of the first electrode SE2 and the second electrode DE2 may be a drain electrode. Each component of the first data conductive layer may include or consist of the same material in the same process.

The first data conductive layer may include aluminum (Al), platinum (Pt), palladium (Pd), silver (Ag), magnesium (Mg), gold (Au), nickel (Ni), neodymium (Nd), iridium (Ir), chromium (Cr), nickel (Ni), calcium (Ca), molybdenum (Mo), titanium (Ti), tungsten (W), copper (Cu), or the like, and may be a single layer or multiple layers. In an embodiment, the first data conductive layer may include a lower layer including a refractory metal such as molybdenum, chromium, tantalum, titanium, or the like, an intermediate layer including a metal having relatively low resistivity such as aluminum, copper, silver, or the like, and an upper layer including a refractory metal, for example. In an embodiment, the first data conductive layer may have a triple layer structure such as titanium/aluminum/titanium (Ti/Al/Ti), for example.

The semiconductor layer A1, the gate electrode G1, the first electrode SE1, and the second electrode DE1 may constitute the first transistor T1. The first transistor T1 may be a driving transistor or a transistor connected to one electrode of the driving transistor. The semiconductor layer A2, the gate electrode G2, the first electrode SE2, and the second electrode DE2 may constitute the second transistor T2. The second transistor T2 may be a transistor connected to the gate electrode G1.

A first planarization layer 181 may be disposed on the first data conductive layer. The first planarization layer 181 may be an organic insulating layer. In an embodiment, the first planarization layer 181 may include an organic insulating material such as a general-purpose polymer such as poly (methyl methacrylate) or polystyrene, a polymer derivative having a phenolic group, an acryl-based polymer, an imide-based polymer (e.g., polyimide), a siloxane-based polymer, or the like, for example.

A second data conductive layer that includes the driving voltage line PL, a first connection electrode LE1, or the like may be disposed on the first planarization layer 181. The first connection electrode LE1 may be connected to the second electrode DE1 of the first transistor T1 through a contact hole defined in the first planarization layer 181. The second data conductive layer may include or consist of the same material in the same process. The second data conductive layer may include aluminum (Al), platinum (Pt), palladium (Pd), silver (Ag), magnesium (Mg), gold (Au), nickel (Ni), neodymium (Nd), iridium (Ir), chromium (Cr), nickel (Ni), calcium (Ca), molybdenum (Mo), titanium (Ti), tungsten (W), copper (Cu), or the like, and may be a single layer or multiple layers. In an embodiment, the second data conductive layer may have a triple layer structure such as titanium/aluminum/titanium (Ti/Al/Ti), for example.

A second planarization layer 182 may be disposed on the second data conductive layer. The second planarization layer 182 may be an organic insulating layer. In an embodiment, the second planarization layer 182 may include an organic insulating material such as a general-purpose polymer such as poly(methyl methacrylate) or polystyrene, a polymer derivative having a phenolic group, an acryl-based polymer, an imide-based polymer (e.g., polyimide), a siloxane-based polymer, or the like, for example.

A third data conductive layer that includes the data line DL and a second connection electrode LE2 may be disposed on the second planarization layer 182. The second connection electrode LE2 may be connected to the first connection electrode LE1 through a contact hole defined in the second planarization layer 182. The third data conductive layer may include or consist of the same material in the same process. The third data conductive layer may include aluminum (Al), platinum (Pt), palladium (Pd), silver (Ag), magnesium (Mg), gold (Au), nickel (Ni), neodymium (Nd), iridium (Ir), chromium (Cr), nickel (Ni), calcium (Ca), molybdenum (Mo), titanium (Ti), tungsten (W), copper (Cu), or the like, and may be a single layer or multiple layers. In an embodiment, the third data conductive layer may have a triple layer structure such as titanium/aluminum/titanium (Ti/Al/Ti), for example.

Although it has been described above that the second data conductive layer includes the driving voltage line PL and the third data conductive layer includes the data line DL, in an embodiment, the first data conductive layer or the second data conductive layer may include the driving voltage line PL and/or the data line DL. Signal lines that each data conductive layer includes may be variously changed.

Each conductive layer (e.g., the first gate conductive layer, the second gate conductive layer, the first data conductive layer, the second data conductive layer, or the third data conductive layer) disposed in the display area DA may include various wire portions disposed in the non-display area PA. In an embodiment, the first data conductive layer, the second data conductive layer, and/or the third data conductive layer may include the driving voltage transfer line, the common voltage transfer line, the data output wire, or the like passing through the bending area BDA, for example. The wire portion of the non-display area PA will be described below with reference to FIG. 5.

A third planarization layer 183 may be disposed on the third data conductive layer. The third planarization layer 183 may be an organic insulating layer. In an embodiment, the third planarization layer 183 may include an organic insulating material such as a general-purpose polymer such as poly(methyl methacrylate) or polystyrene, a polymer derivative having a phenolic group, an acryl-based polymer, an imide-based polymer (e.g., polyimide), a siloxane-based polymer, or the like, for example.

A pixel conductive layer including a pixel electrode 191 may be disposed on the third planarization layer 183. The pixel electrode 191 may be connected to the second connection electrode LE2 through a contact hole defined in the third planarization layer 183. The pixel electrode 191 may be electrically connected to the second electrode DE1 to receive a driving current for controlling luminance of the light-emitting element LED. The pixel conductive layer may include or consist of the same material in the same process. The pixel conductive layer may include a metal such as silver (Ag), lithium (Li), calcium (Ca), aluminum (Al), magnesium (Mg), or gold (Au). The pixel conductive layer may include a transparent conductive oxide ("TCO") such as an indium tin oxide ("ITO") or an indium zinc oxide ("IZO").

A pixel defining layer 360 may be disposed on the pixel conductive layer. A pixel opening 365A, 365B, or 365C overlapping the pixel electrode 191 may be defined in the pixel defining layer 360. The pixel defining layer 360 may include an organic insulating material such as a general-purpose polymer such as poly(methyl methacrylate) or polystyrene, a polymer derivative having a phenolic group, an acryl-based polymer, an imide-based polymer (e.g., polyimide), a siloxane-based polymer, or the like. The pixel defining layer 360 may be a black pixel defining layer 360 including black dye or pigment. The black pixel defining layer 360 may improve a contrast ratio, and may prevent reflection by a metal layer disposed therebelow.

Light-emitting layers 370A, 370B, and 370C (also collectively referred to as a light-emitting layer 370) may be disposed on the pixel electrode 191. At least a portion of the light-emitting layers 370A, 370B, and 370C may be disposed in the pixel openings 365A, 365B, and 365C. The light-emitting layers 370A, 370B, and 370C may include material layers that uniquely emit light of basic colors such as red, green, blue, or the like. The light-emitting layers 370A, 370B, and 370C may have a structure in which material layers emitting light of different colors are stacked. In addition to the light-emitting layers 370A, 370B, and 370C, at least one of a hole injection layer, a hole transport layer, an electron transport layer, and an electron injection layer may be disposed on the pixel electrode 191.

A common electrode 270 may be disposed on the light-emitting layers 370A, 370B, and 370C and the pixel defining layer 360. The common electrode 270 may be provided in common to all pixels PX. The common electrode 270 may include a metal such as calcium (Ca), barium (Ba), magnesium (Mg), aluminum (Al), silver (Ag), platinum (Pt), palladium (Pd), gold (Au), nickel (Ni), neodymium (Nd), iridium (Ir), chromium (Cr), lithium (Li), or the like. The common electrode 270 may include a transparent conductive oxide ("TCO") such as an indium tin oxide ("ITO") or an indium zinc oxide ("IZO").

The pixel electrode 191, the light-emitting layers 370A, 370B, and 370C, and the common electrode 270 form the light-emitting element LED. The pixel electrode 191 may be an anode of the light-emitting element LED, and the common electrode 270 may be a cathode of the light-emitting element LED.

An encapsulation layer 390 may be disposed on the common electrode 270. The encapsulation layer 390 may encapsulate the light-emitting element LED to prevent penetration of moisture and oxygen from the outside. The encapsulation layer 390 may be a thin film encapsulation layer including one or more inorganic layers and one or more organic layers. In an embodiment, the encapsulation layer 390 may have a triple layer structure of inorganic layer/organic layer/inorganic layer, for example.

The touch sensor layer may be disposed on the encapsulation layer 390.

The touch sensor layer may include a first insulating layer 410 disposed on the encapsulation layer 390. The first insulating layer 410 may cover the encapsulation layer 390 to protect the encapsulation layer 390, and may prevent moisture permeation. The first insulating layer 410 may reduce parasitic capacitance between the common electrode 270 and a touch electrode 451.

A first touch conductive layer that includes a bridge 452 or the like may be disposed on the first insulating layer 410, and a second insulating layer 420 may be disposed on the first touch conductive layer. A second touch conductive layer including the touch electrode 451 may be disposed on the second insulating layer 420, and a passivation layer 430 may be disposed on the second touch conductive layer.

The touch electrode 451 may include first touch electrodes and second touch electrodes that form a mutual sensing capacitor. The bridge 452 may electrically connect the first touch electrodes or the second touch electrodes. In an embodiment, the first touch electrodes that are adjacent to be separated from each other may be connected to the bridge 452 through contact holes defined in the second insulating layer 420, and may be electrically connected through the bridge 452, for example.

The first insulating layer 410 and the second insulating layer 420 may include an inorganic insulating material such as a silicon nitride, a silicon oxide, a silicon oxynitride, or the like, and may be a single layer or multiple layers. The passivation layer 430 may include an inorganic insulating material such as a silicon nitride, a silicon oxide, a silicon oxynitride, or the like, or may include an organic material such as an acryl-based polymer, a polyimide-based resin, or the like.

A first touch electrode layer and a second touch electrode layer may have a mesh shape in which openings overlapping the pixels PX are defined. The first touch electrode layer may include or consist of the same material in the same process. The second touch electrode layer may include or consist of the same material in the same process. Each of the first touch electrode layer and the second touch electrode layer may include a metal such as aluminum (Al), copper (Cu), titanium (Ti), molybdenum (Mo), silver (Ag), chromium (Cr), nickel (Ni), or the like.

An anti-reflection portion 300 may be disposed above the touch sensor layer. The anti-reflection portion 300 may prevent external light incident from the outside from being reflected by a wire or the like to be recognized.

Figure 5:
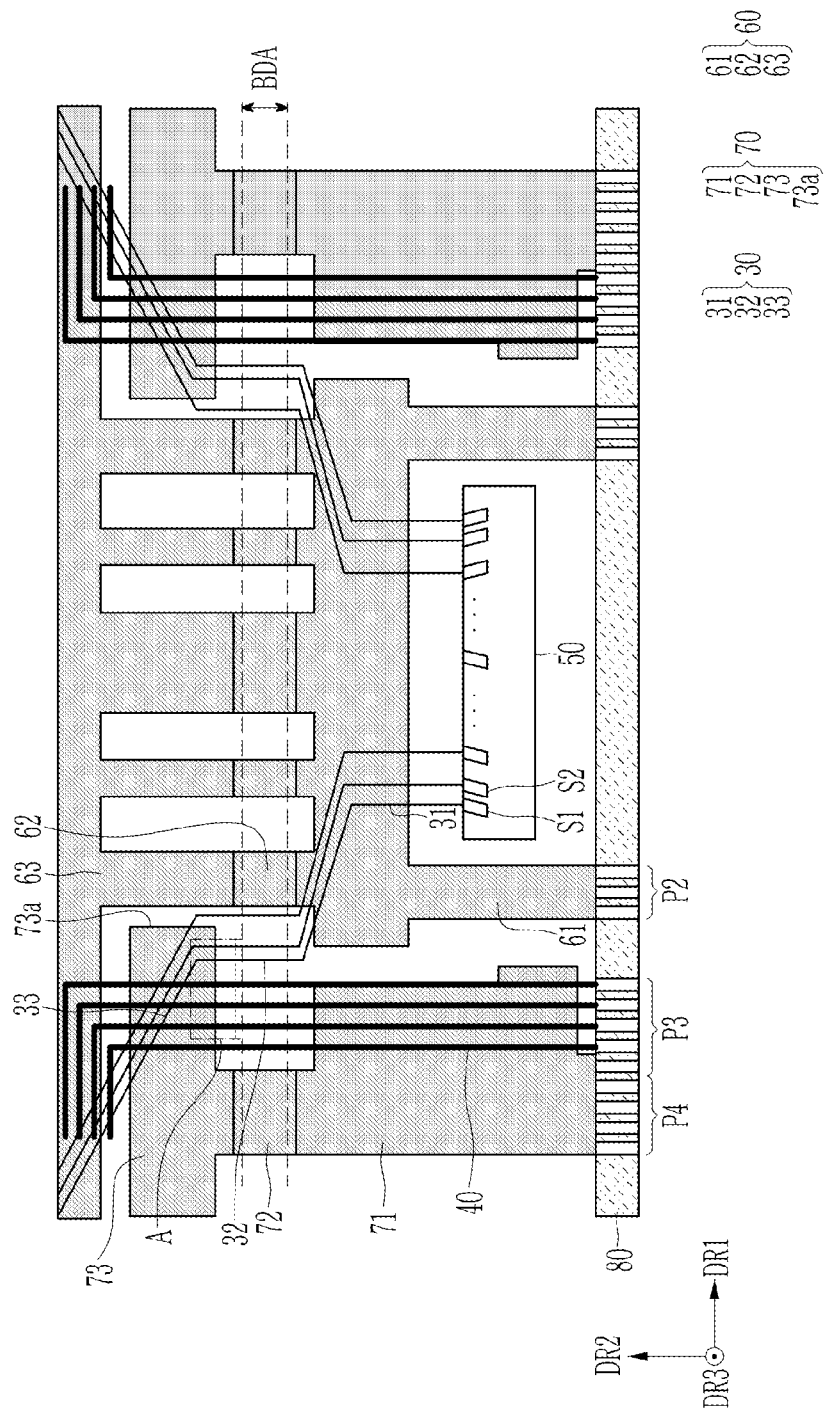
FIG. 5 is an enlarged disposition view of an embodiment of a second peripheral area of the display panel.

FIG. 5 is an enlarged disposition view of an embodiment of the second peripheral area of the display panel. A wire structure of the second peripheral area will be described with reference to a cross-sectional structure of FIG. 4.

Referring to FIG. 5, the driving voltage transfer line 60 may include a first portion 61 extending from the terminal P2 of the pad portion 80 toward the bending area BDA, a second portion 62 that is connected to the first portion 61 and passes through the bending area BDA, and a third portion 63 that is connected to the second portion 62 and extends toward the display area DA. The second portion 62 of the driving voltage transfer line may be disposed in the bending area BDA and a periphery of the bending area BDA. The driving voltage transfer line 60 may be connected to the driving voltage line PL of the display area DA to supply a driving voltage to the pixels PX.

The driving voltage transfer line 60 may include or consist of at least one of conductive layers constituting the display area DA. The second portion 62 of the driving voltage transfer line including the bending area BDA may have the same layer position in a cross-section as the first portion 61 and the third portion 63, and may have a different layer position in a cross-section from the first portion 61 and the third portion 63.

In an embodiment, referring to FIG. 4 together, the first portion 61 of the driving voltage transfer line may be disposed in the same layer as the first and second electrodes SE1 and SE2 and the second electrodes DE1 and DE2 disposed in the display area DA, and may be formed in the same process as the first and second electrodes SE1 and SE2 and the second electrodes DE1 and DE2 disposed in the display area DA, for example. That is, the first portion 61 of the driving voltage transfer line may be formed as the first data conductive layer. The second portion 62 of the driving voltage transfer line may be disposed in the same layer as the driving voltage line PL and the first connection electrode LE1 disposed in the display area DA, and may be formed in the same process as the driving voltage line PL and the first connection electrode LE1 disposed in the display area DA. That is, the second portion 62 of the driving voltage transfer line may be formed as the second data conductive layer.

The common voltage transfer line 70 may include a first portion 71 extending from the terminal P4 of the pad portion 80 toward the bending area BDA, a second portion 72 that is connected to the first portion 71 and passes through the bending area BDA, and a third portion 73 that is connected to the second portion 72 and extends toward the display area DA. The third portion 73 of the common voltage transfer line may include a portion of a shielding portion 73a extending in the first direction DR1 and protruding. The common voltage transfer line 70 may transfer a common voltage to each pixel PX.

The common voltage transfer line 70 may include at least one of conductive layers constituting the display area DA. The second portion 72 of the common voltage transfer line disposed in the bending area BDA may have the same layer position in a cross-section as the first portion 71 and the third portion 73, and may have a different layer position in a cross-section from the first portion 71 and the third portion 73.

In an embodiment, referring to FIG. 4 together, the first portion 71 of the common voltage transfer line may be disposed in the same layer as the first and second electrodes SE1 and SE2 and the second electrodes DE1 and DE2 disposed in the display area DA, and may be formed in the same process as the first and second electrodes SE1 and SE2 and the second electrodes DE1 and DE2 disposed in the display area DA, for example. That is, the first portion 71 of the common voltage transfer line may be formed as the first data conductive layer. The second portion 72 of the common voltage transfer line passing through the bending area BDA may be disposed in the same layer as the driving voltage line PL and the first connection electrode LE1 disposed in the display area DA, and may be formed in the same process as the driving voltage line PL and the first connection electrode LE1 disposed in the display area DA. That is, the second portion 72 of the common voltage transfer line may be formed as the second data conductive layer. The shielding portion 73a of the common voltage transfer line may be disposed around the bending area BDA, and may include or consist of the second data conductive layer.

A wire formed in the first data conductive layer may be connected to a wire formed in the second data conductive layer through a contact hole penetrating the first planarization layer 181. The wire formed in the second data conductive layer may be connected to a wire formed in the third data conductive layer through a contact hole penetrating the second planarization layer 182. The wire formed in the first data conductive layer and the wire formed in the third data conductive layer may be connected through a contact hole penetrating the first planarization layer 181 and the second planarization layer 182.

Thus, a wire formed in each conductive layer may be connected to a wire to which the same voltage is applied using contact holes penetrating insulating layers disposed between the conductive layers.

The touch wire 40 may be connected to the terminal P3 of the pad portion 80, and may provide the touch driving signal to the touch sensor TE disposed in the display area DA. The touch wire 40 may include or consist of the first touch conductive layer or the second touch conductive layer. The touch wire 40 may include a ground wire that is disposed in the non-display area PA and at least partially surrounds the display area DA.

The data output wire 30 may include a first portion 31 extending from terminals S1 and S2 of the data driver 50 toward the bending area BDA, a second portion 32 that is connected to the first portion 31 and passes through the bending area BDA, and a third portion 33 that is connected to the second portion 32 and extends toward the display area DA. The data output wire 30 may be connected to each of the terminals S1 and S2 of the data driver 50 to transfer a data voltage received from the data driver 50 to the data lines.

The data output wire 30 may include or consist of at least one of conductive layers constituting the display area DA. The second portion 32 of the data output wire including the bending area BDA may have the same layer position in a cross-section as the first portion 31 and the third portion 33, and may have a different layer position in a cross-section from the first portion 31 and the third portion 33.

In an embodiment, referring to FIG. 4 together, the first portion 31 of the data output wire adjacent to the data driver 50 may be formed as the first gate conductive layer that includes the gate electrodes G1 and G2 of the display area or the second gate conductive layer that includes the upper electrode C2 of the storage capacitor, for example. The second portion 32 of the data output wire passing through the bending area BDA may include or consist of the second data conductive layer including the driving voltage line PL and the first connection electrode LE1 disposed in the display area DA. The third portion 33 of the data output wire after passing through the bending area BDA may be formed as the first gate conductive layer or the second gate conductive layer to extend to the display panel.

A wire formed in the first gate conductive layer may be connected to a wire formed in the second gate conductive layer through a contact hole defined in the second gate insulating layer 142. The wire formed in the second gate conductive layer may be connected to the wire formed in the second data conductive layer through a contact hole passing through the first inter-insulating layer 161 and the first planarization layer 181. Thus, a wire formed in each conductive layer may be connected to a wire to which the same voltage is applied using contact holes penetrating insulating layers disposed between the conductive layers.

Referring to FIG. 5, the third portion 33 of the data output wire may overlap the touch wire 40 in a plan view. Accordingly, coupling or noise may occur at the touch wire 40 according to a voltage change of a signal applied to the data output wire 30. In an embodiment, the shielding portion 73a in which a portion of the common voltage transfer line 70 is extended may be formed between the touch wire 40 and the data output wire 30 so that a voltage characteristic of the touch wire 40 is protected (shielded) from a voltage fluctuation in another portion.

In an embodiment, the third portion 33 of the data output wire may be formed as the first gate conductive layer, and the touch wire 40 may be formed as the first touch conductive layer, for example. The shielding portion 73a of the common voltage transfer line 70 may be formed as any one of the first data conductive layer, the second data conductive layer, and the third data conductive layer disposed between the first gate conductive layer and the first touch conductive layer. That is, the third portion 33 of the data output wire 30, the shielding portion 73a that is a portion of the common voltage transfer line 70, and the touch wire 40 may be sequentially disposed from the bottom in the third direction DR3.

Accordingly, since the touch wire 40 may not be affected by a voltage fluctuation of the data output wire 30, noise and coupling of signals may be prevented from occurring.

As a portion of the common voltage transfer line 70 extends to the shielding portion 73a, the common voltage transfer line 70 and the data output wire 30 may be disposed adjacent to each other. Accordingly, corrosion may occur due to a potential difference between the common voltage transfer line 70 and the data output wire 30 adjacent to the common voltage transfer line 70. The larger a potential difference between adjacent wires, the faster corrosion occurs, and the smaller the potential difference, the slower the corrosion occurs. The following embodiments may prevent or delay corrosion of the data output wire 30 by reducing a potential difference between the common voltage transfer line 70 and the data output wire 30 adjacent to the common voltage transfer line 70.

Figure 6:
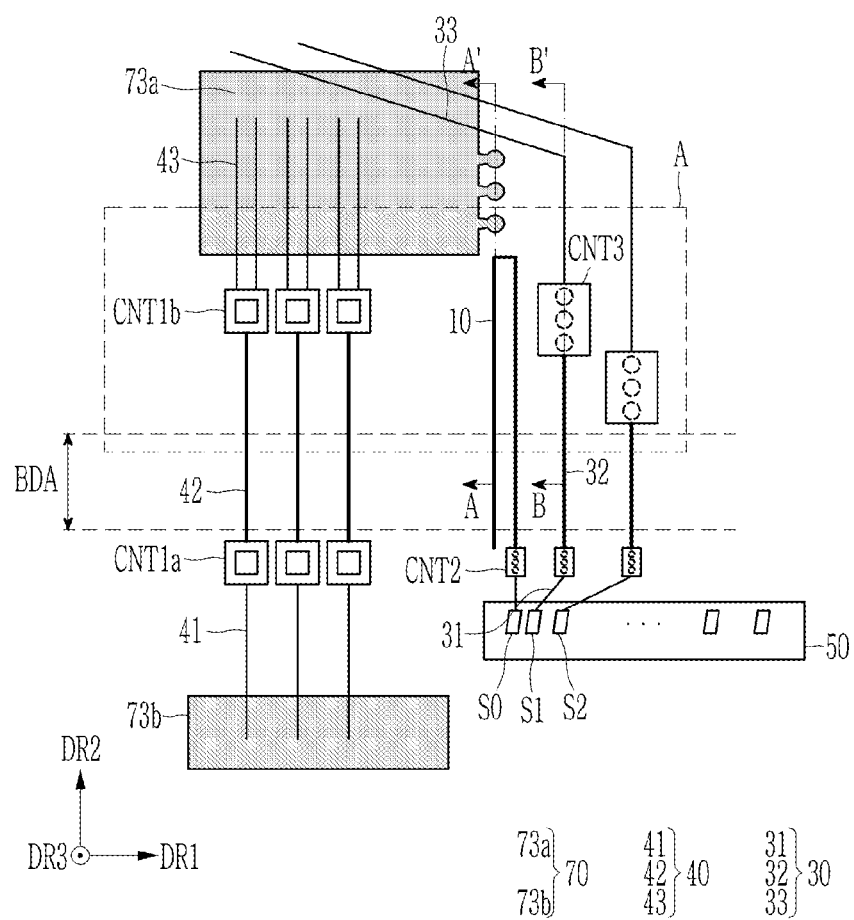
FIG. 6 is a partially enlarged view of an embodiment including a region A of FIG. 5.

FIG. 6 is a partially enlarged view of an embodiment including a region A of FIG. 5.

Shielding portions 73a and 73b of the common voltage transfer line 70 may be disposed above and below the first direction DR1 based on the bending area BDA. In an embodiment, the shielding portions 73a and 73b may be disposed around the bending area BDA, and may be formed as the second data conductive layer, for example.

The touch wire 40 may include a first portion 41 disposed below the bending area BDA, a second portion 42 disposed around the bending area BDA, and a third portion 43 disposed above the bending area BDA based on the bending area BDA. The touch wire 40 may transfer the touch driving signal to the touch sensor layer. The touch wire 40 may include the ground wire that is disposed in the non-display area PA and at least partially surrounds the display area DA.

In an embodiment, the first portion 41 and the third portion 43 of the touch wire 40 may be formed as the first touch conductive layer or the second touch conductive layer, and the second portion 42 of the touch wire 40 passing through the bending area BDA may be formed as the second data conductive layer. The first portion 41 and the second portion 42 of the touch wire 40 may be connected through a contact hole defined in a contact portion CNT1a, and the second portion 42 and the third portion 43 of the touch wire 40 may be connected through a contact hole defined in a contact part CNT1b.

The data output wire 30 may transfer a data voltage to a data line of the display area through the first portion 31 extending from the data driver 50, the second portion 32 passing through the bending area BDA and a periphery of the bending area BDA, and the third portion 33 that is connected to the second portion 32 and extends toward the display area. The second portion 32 of the data output wire 30 passing through the bending area BDA may extend across the bending area BDA, and may be electrically connected to the third portion 33 through a data contact portion CNT3.

Referring to FIG. 6, the shielding portion 73a in which a portion of the common voltage transfer line 70 is extended may be disposed adjacent to the data contact portion CNT3 of the data output wire 30, and corrosion may occur at the data output wire 30 having a relatively high potential as a voltage difference between the two wires occurs.

In an embodiment, a common voltage applied to the common voltage transfer line 70 may be a constant voltage of negative polarity. A data voltage applied to the data output wire 30 disposed adjacent to the common voltage transfer line 70 may be a relatively high potential voltage, for example. In an embodiment, the common voltage applied to the common voltage transfer line 70 may be about −2.5 volts (V), and the data voltage applied to the data output wire 30 may be about 5 V, for example. In this case, a potential difference between the two wires may be about 7.5 V, and when a potential difference occurs between adjacent wires, corrosion may occur at a high-potential wire under an environmental reliability condition (e.g., a moisture permeable environment). Accordingly, corrosion may occur at the data contact portion CNT3 of the data output wire 30 that transfers a data signal so that a defect of the display panel DP is caused.

In an embodiment, a sacrificial wire 10 may be disposed between the shielding portion 73a of the common voltage transfer line 70 and the data contact portion CNT3 of the data output wire 30. The data driver 50 may include a sacrificial terminal S0 for applying a voltage to the sacrificial wire 10. One end of the sacrificial wire 10 may be connected to the sacrificial terminal S0 to receive a predetermined voltage, and the other end of the sacrificial wire 10 may not be connected to wires disposed in the display area DA. In an embodiment, the sacrificial wire 10 may not be connected to the data line of the display area so that even when the sacrificial wire 10 is damaged, driving of the display panel is not affected, for example.

The sacrificial terminal S0 may be disposed at the data driver 50, and may apply a predetermined voltage to the sacrificial wire 10. An output value of the sacrificial terminal S0 may be determined as a voltage between voltage levels of both adjacent wires. In an embodiment, the sacrificial terminal S0 may copy an output of the first terminal S1 adjacent to the sacrificial terminal S0 without being fixed to a predetermined voltage to output the copied output. That is, the sacrificial terminal S0 may output the same voltage as a voltage of the first terminal S1. In this case, a voltage difference between an output signal of the sacrificial terminal S0 and an output signal of the first terminal S1 may not occur. This may be advantageous in corrosion.

The sacrificial wire 10 may be disposed between the common voltage transfer line 70 and the data output wire 30, and may be connected to the sacrificial terminal S0 of the data driver 50 to receive a voltage that is higher than the common voltage and is lower than or equal to the data voltage.

In an embodiment, the common voltage applied to the common voltage transfer line 70 may be about −5 V, and the data voltage output from the first terminal S1 connected to the data output wire 30 may be about +5 V, for example. In this case, the sacrificial terminal S0 may output an intermediate potential between the common voltage (about −5 V) and the data voltage (about +5 V) or a voltage equal to the data voltage. The sacrificial terminal S0 may copy the data voltage (about +5 V) of the first terminal S1 to output the data voltage (about +5 V) of the first terminal S1. Accordingly, a potential difference between both wires may be reduced so that corrosion of the data output wire 30 including the data contact portion CNT3 is delayed or prevented.

The sacrificial wire 10 may be connected at the sacrificial terminal S0 to be disposed crossing the bending area BDA in the second direction DR2. The sacrificial wire 10 may be disposed between the common voltage transfer line 70 and the data output wire 30. The sacrificial wire 10 may be disposed to extend from the sacrificial terminal S0 and cross between the shielding portion 73a of the common voltage transfer line 70 and the data contact portion CNT3 of the data output wire 30.

In an embodiment, the sacrificial wire 10 may be bent at least once to secure a sufficient length within a relatively small area. In an embodiment, the sacrificial wire 10 may extend in the second direction DR2, may be bent and extended in an opposite direction of the first direction DR1, and then may be bent and extended in an opposite direction of the second direction, for example. That is, the sacrificial wire 10 may be bent twice to be disposed in a C-shape. In an alternative embodiment, the sacrificial wire 10 may be bent four times in the same way to be disposed in a " ㄹ " shape. The sacrificial wire 10 may be to be disposed in an I-shape without being bent. A length, the number of times of bending, and a shape of the sacrificial wire may be variously changed.

In FIG. 6, the description has been made based on the wires disposed above the bending area BDA, but the shielding portion 73b of the common voltage transfer line 70 may be disposed below the bending area BDA, and corrosion of the data output wire 30 may be prevented or delayed by disposing a sacrificial wire (not shown) between the common voltage transfer line 70 and the data output wire 30.

Figure 7:
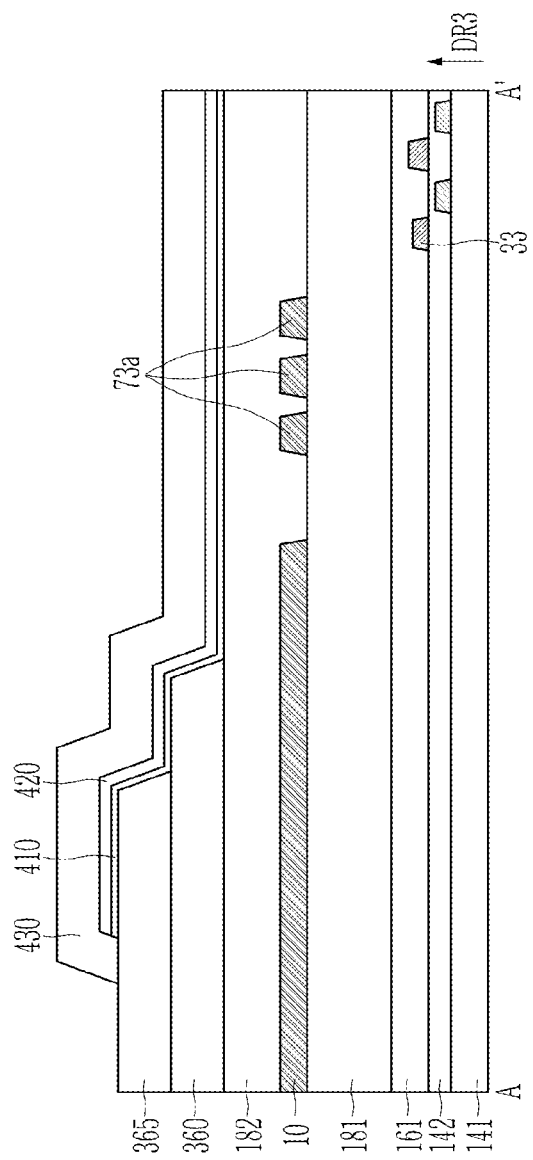
FIGS. 7 and 8 are cross-sectional views taken along line A-A' of an embodiment of FIG. 6.
Figure 8:
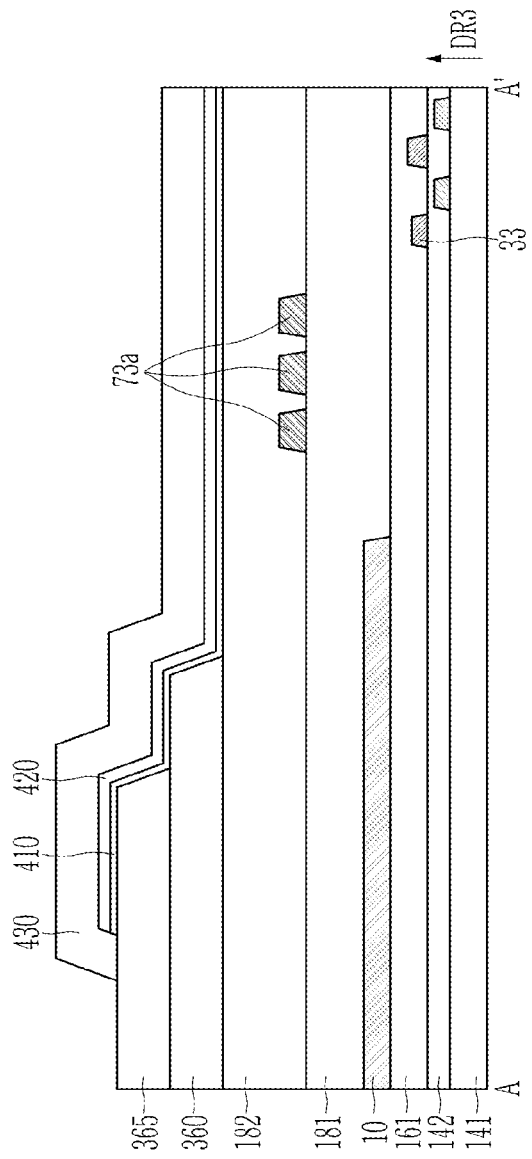

FIGS. 7 and 8 are cross-sectional views taken along line A-A' of an embodiment of FIG. 6.

FIGS. 7 and 8 are stacked in the same order as a stacking structure disposed in the display area of the display device of FIG. 4, and some components are omitted in FIGS. 7 and 8. A detailed description of the same configuration as that of the previous embodiment is omitted. The omitted configuration follows the description of the previous embodiment.

Referring to FIG. 7, the first gate conductive layer that includes the gate electrodes G1 and G2 or the like of the display area may be disposed on the first gate insulating layer 141. The first gate conductive layer may include a metal such as molybdenum (Mo), aluminum (Al), copper (Cu), titanium (Ti), or the like, or a metal alloy, and may be a single layer or multiple layers.

The second gate insulating layer 142 may be disposed on the first gate conductive layer. The second gate insulating layer 142 may include an inorganic insulating material such as a silicon nitride, a silicon oxide, a silicon oxynitride, or the like, and may be a single layer or multiple layers.

The third portion 33 of the data output wire may be disposed on the second gate insulating layer 142. The third portion 33 of the data output wire may be disposed in the same layer as the upper electrode C2 of the storage capacitor of the display area DA, and may be formed in the same process as the upper electrode C2 of the storage capacitor of the display area DA. That is, the third portion 33 of the data output wire may be formed as the second gate conductive layer. In an embodiment, the third portion 33 of the data output wire may be formed as the first gate conductive layer. The second gate conductive layer may include a metal such as molybdenum (Mo), aluminum (Al), copper (Cu), titanium (Ti), or the like, or a metal alloy, and may be a single layer or multiple layers.

The first inter-insulating layer 161 may be disposed on the second gate conductive layer. The first inter-insulating layer 161 may include an inorganic insulating material such as a silicon nitride, a silicon oxide, a silicon oxynitride, or the like, and may be a single layer or multiple layers.

The first planarization layer 181 may be disposed on the first inter-insulating layer 161. The first planarization layer 181 may be an organic insulating layer.

The sacrificial wire 10 and the shielding portion 73a that is a portion of the common voltage transfer line may be disposed on the first planarization layer 181. The sacrificial wire 10 and the shielding portion 73a may be disposed in the same layer as the driving voltage line PL and the first connection electrode LE1 of the display area DA, and may be formed in the same process as the driving voltage line PL and the first connection electrode LE1 of the display area DA. That is, the sacrificial wire 10 and the shielding portion 73a may be formed as the second data conductive layer.

Referring to FIG. 6 together, the sacrificial wire 10 may be disposed to cross between the common voltage transfer line 70 including the shielding portion 73a and the data output wire 30 in a plan view; and may be disposed at the same layer (e.g., the second data conductive layer) as the common voltage transfer line 70 in a cross-section. The sacrificial wire 10 may have an intermediate potential between a potential of the common voltage transfer line 70 and a potential of the data output wire 30 to reduce a potential difference between adjacent wires, or may have the same voltage as that of the data output wire 30 adjacent to the sacrificial wire 10 and may be corroded instead of the data output wire 30.

The second planarization layer 182 may be disposed on the second data conductive layer. The second planarization layer 182 may be an organic insulating layer. The pixel defining layer 360 and a spacer 365 may be disposed above or on the second planarization layer 182. The first insulating layer 410 and the second insulating layer 420 constituting the touch sensor layer may be disposed above or on the second planarization layer 182, the pixel defining layer 360, and the spacer 365. The passivation layer 430 may be disposed on the touch sensor layer.

The embodiment of FIG. 8 differs from the embodiment of FIG. 7 in that the sacrificial wire 10 is disposed in a different layer from the shielding portion 73a. A detailed description of the same configuration as that of the previous embodiment is omitted. The omitted configuration follows the description of the previous embodiment.

Referring to FIG. 8, the sacrificial wire 10 may be disposed on the first inter-insulating layer 161. The sacrificial wire 10 may be disposed in the same layer as the first and second electrodes SE1 and SE2 and the second electrodes DE1 and DE2 disposed in the display area DA, and may be formed in the same process as the first and second electrodes SE1 and SE2 and the second electrodes DE1 and DE2 disposed in the display area DA. That is, the sacrificial wire 10 may be formed as the first data conductive layer.

The first planarization layer 181 may be disposed on the sacrificial wire 10. The first planarization layer 181 may be an organic insulating layer. In an embodiment, the first planarization layer 181 may include an organic insulating material such as a general-purpose polymer such as poly (methyl methacrylate) or polystyrene, a polymer derivative having a phenolic group, an acryl-based polymer, an imide-based polymer (e.g., polyimide), a siloxane-based polymer, or the like, for example. The first planarization layer 181 may include an organic insulating material so that an ion moves in a moisture permeable environment.

The shielding portion 73a of the common voltage transfer line 70 may be disposed on the first planarization layer 181. The shielding portion 73a may be disposed in the same layer as the driving voltage line PL and the first connection electrode LE1 of the display area DA, and may be formed in the same process as the driving voltage line PL and the first connection electrode LE1 of the display area DA. That is, the shielding portion 73a may be formed as the second data conductive layer.

In the embodiment of FIG. 8, the sacrificial wire 10 and the shielding portion 73a of the common voltage transfer line 70 are disposed in different layers with the first planarization layer 181 that is an organic insulating layer and is interposed between the sacrificial wire 10 and the shielding portion 73a. Since an ion may move within the organic layer in a moisture permeable environment, corrosion may occur due to a potential difference between the sacrificial wire 10 and the common voltage transfer line 70.

That is, even when the sacrificial wire 10 and wires adjacent to the sacrificial wire 10 are disposed in different layers with the organic layer interposed between the sacrificial wire 10 and the adjacent wires, the sacrificial wire 10 may be corroded instead of the adjacent wire so that corrosion of the adjacent wire is prevented or delayed.

Figure 9:
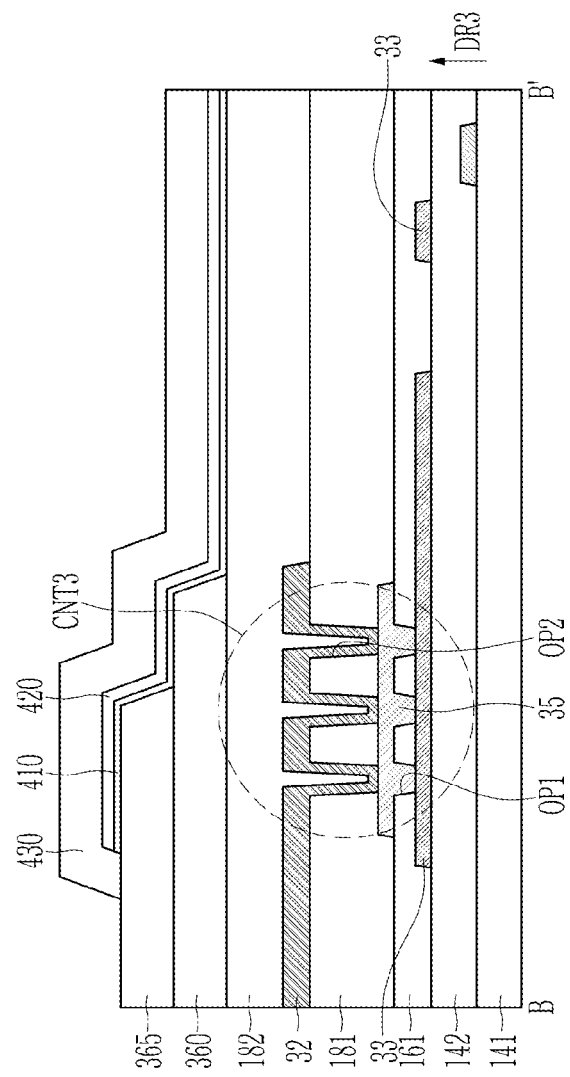
FIG. 9 is a cross-sectional view taken along line B-B' of FIG. 6.

FIG. 9 is a cross-sectional view taken along line B-B' of FIG. 6. FIG. 9 is a cross-sectional view including the data contact portion CNT3 of the data output wire 30. A detailed description of the same configuration as that of the previous embodiment is omitted.

Referring to FIG. 9, the third portion 33 of the data output wire may be disposed on the second gate insulating layer 142. The third portion 33 of the data output wire may be disposed in the same layer as the upper electrode C2 of the storage capacitor of the display area DA, and may be formed in the same process as the upper electrode C2 of the storage capacitor of the display area DA. That is, the third portion 33 of the data output wire may be formed as the second gate conductive layer. The second gate conductive layer may include a metal such as molybdenum (Mo), aluminum (Al), copper (Cu), titanium (Ti), or the like, or a metal alloy, and may be a single layer or multiple layers. In an embodiment, the third portion 33 of the data output wire may be formed as the first gate conductive layer.

The first inter-insulating layer 161 may be disposed on the second gate conductive layer. The first inter-insulating layer 161 may include an inorganic insulating material such as a silicon nitride, a silicon oxide, a silicon oxynitride, or the like, and may be a single layer or multiple layers. An opening OP1 that is patterned to expose a portion of the third portion 33 of the data output wire may be defined in the first inter-insulating layer 161.

A connection electrode 35 may be disposed on the first inter-insulating layer 161. The connection electrode 35 may be disposed in the same layer as the first and second electrodes SE1 and SE2 and the second electrodes DE1 and DE2 disposed in the display area DA, and may be formed in the same process as the first and second electrodes SE1 and SE2 and the second electrodes DE1 and DE2 disposed in the display area DA. That is, the connection electrode 35 may be formed as the first data conductive layer. The connection electrode 35 may overlap the opening OP1 of the first inter-insulating layer 161, and may be connected to the third portion 33 of the data output wire. A portion of the connection electrode 35 may be disposed within the opening OP1.

The first planarization layer 181 may be disposed on the first inter-insulating layer 161 and the connection electrode 35. The first planarization layer 181 may be an organic insulating layer. An opening OP2 that is patterned to expose a portion of the connection electrode 35 may be defined in the first planarization layer 181.

The second portion 32 of the data output wire may be disposed on the first planarization layer 181. The second portion 32 of the data output wire may be disposed in the same layer as the driving voltage line PL and the first connection electrode LE1 disposed in the display area DA, and may be formed in the same process as the driving voltage line PL and the first connection electrode LE1 disposed in the display area DA. That is, the second portion 32 of the data output wire may be formed as the second data conductive layer. The second portion 32 of the data output wire may overlap the opening OP2 of the first planarization layer 181, and may be connected to the connection electrode 35. A portion of the second portion 32 of the data output wire may be disposed within the opening OP2 of the first planarization layer 181.

The data contact portion CNT3 may include the connection electrode 35 and the second portion 32 and the third portion 33 of the data output wire overlapping the connection electrode 35. The second portion 32 of the data output wire may be electrically connected to the third portion 33 of the data output wire through the data contact portion CNT3 including the connection electrode 35.

In FIGS. 7 to 9, the embodiment in which the common voltage transfer line 70 is formed as the second data conductive layer and the sacrificial wire 10 is formed as the first data conductive layer or the second conductive layer has been described, but the common voltage transfer line 70 and the sacrificial wire 10 may be formed as the third data conductive layer that includes the data line DL, the second connection electrode LE2, or the like of the display area. In an embodiment, the common voltage transfer line 70, the data output wire 30, and the sacrificial wire 10 disposed between the common voltage transfer line 70 and the data output wire 30 in a plan view may be formed in various ways using the first data conductive layer, the second data conductive layer, and/or the third data conductive layer of the display area. In addition, the sacrificial wire 10 may be disposed in the same layer as the common voltage transfer line 70 and/or the data output wire 30 in a cross-section, or the sacrificial wire 10 and the common voltage transfer line 70 (or the data output wire 30) may be disposed in different layers with an organic layer interposed between the sacrificial wire 10 and the common voltage transfer line 70 (or the data output wire 30).

FIGS. 10 to 18 are enlarged views of an embodiment of a periphery of the bending area.

Figure 10:
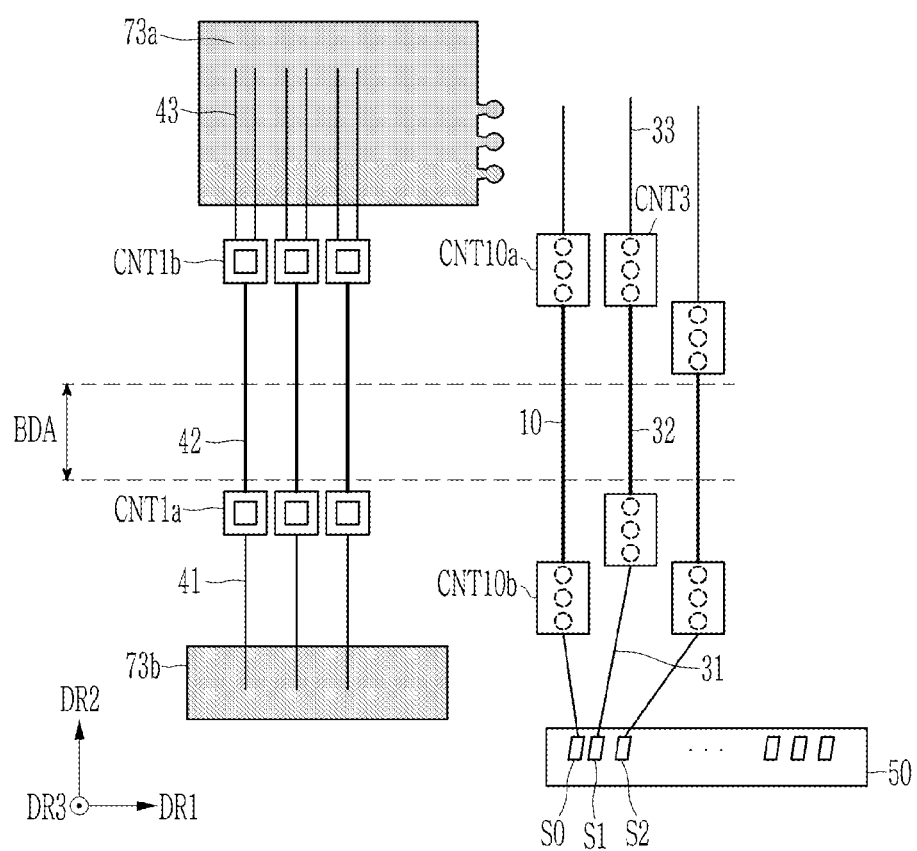
FIGS. 10 to 18 are enlarged views of an embodiment of a periphery of a bending area.

The embodiment of FIG. 10 differs from the embodiment of FIG. 6 in that the sacrificial wire further includes a sacrificial contact portion. A detailed description of the same configuration as that of the previous embodiment is omitted. The omitted configuration follows the description of the previous embodiment.

Referring to FIG. 10, the sacrificial contact portion CNT10a may be disposed between the shielding portion 73a of the common voltage transfer line 70 and the data contact portion CNT3 of the data output wire 30. In addition, the shielding portion 73b of the common voltage transfer line 70 may be disposed below the bending area BDA, and the sacrificial contact portion CNT10b may be disposed between the shielding portion 73b and the data output wire 30.

The sacrificial contact portions CNT10a and CNT10b may include or consist of the same material in the same process as the data contact portion CNT3 of FIG. 9 of the data output wire 30. In an embodiment, the sacrificial contact portions CNT10a and CNT10b may further include a portion of the sacrificial wire 10, a dummy wire overlapping a portion of the sacrificial wire 10, and a dummy connection electrode connecting a portion of the sacrificial wire 10 and the dummy wire respectively corresponding to the second portion 32 and the third portion 33 of the data output wire and the connection electrode 35 constituting the data contact portion CNT3, for example. A portion of the sacrificial wire 10 may be disposed in the same layer as the second portion 32 of the data output wire, the dummy wire may be disposed in the same layer as the third portion 33 of the data output wire, and the dummy connection electrode may be disposed in the same layer as the connection electrode 35 of the data contact portion CNT3. One end of the dummy wire overlaps a portion of the sacrificial wire 10 and the dummy connection electrode, and the other end of the dummy wire is not connected to another portion.

The sacrificial wire 10 may be connected to the sacrificial terminal S0 to receive a predetermined voltage or an adjacent data voltage. The sacrificial terminal S0 may output a voltage level between the common voltage transfer line 70 and the data output wire 30, or may copy a data voltage of the first terminal S1 connected to the data output wire 30 to output the copied data voltage of the first terminal S1.

One end of the sacrificial wire 10 may be connected to the sacrificial terminal S0 to receive a voltage that is higher than the common voltage and is lower than or equal to the data voltage. Thus, corrosion of the data output wire 30 may be prevented or delayed by reducing a potential difference between wires adjacent to the sacrificial wire 10. The other end of the sacrificial wire 10 may include the sacrificial contact portions CNT10a and CNT10b formed in the same process as the data contact portion CNT3, and may be corroded instead of the data contact portion CNT3.

Figure 11:
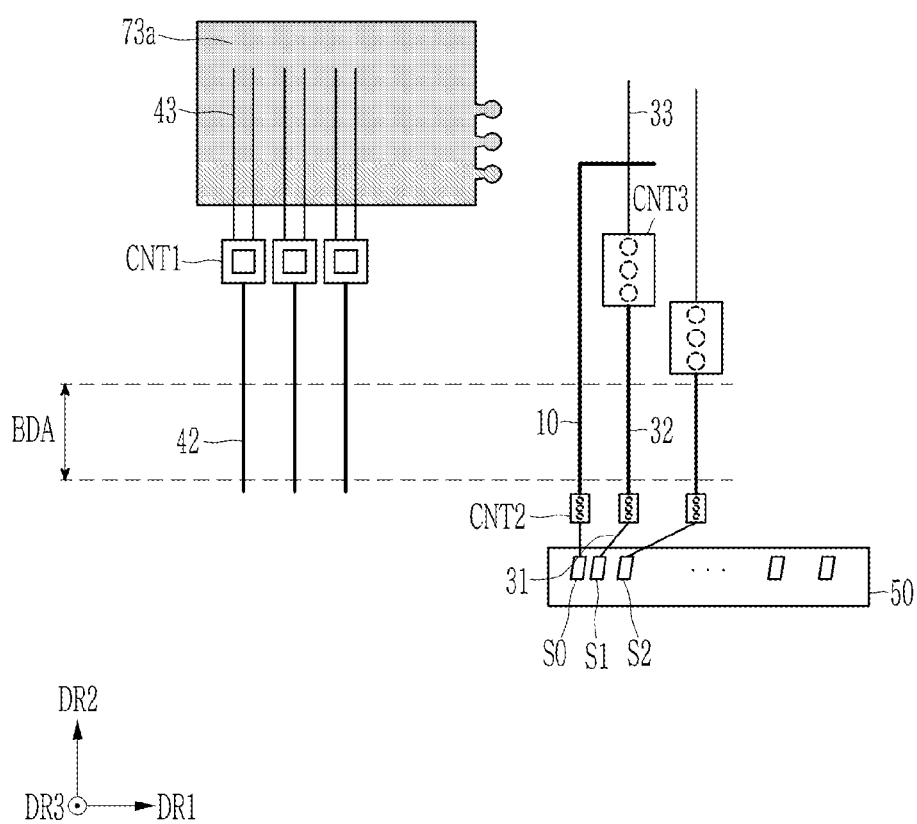
Figure 12:
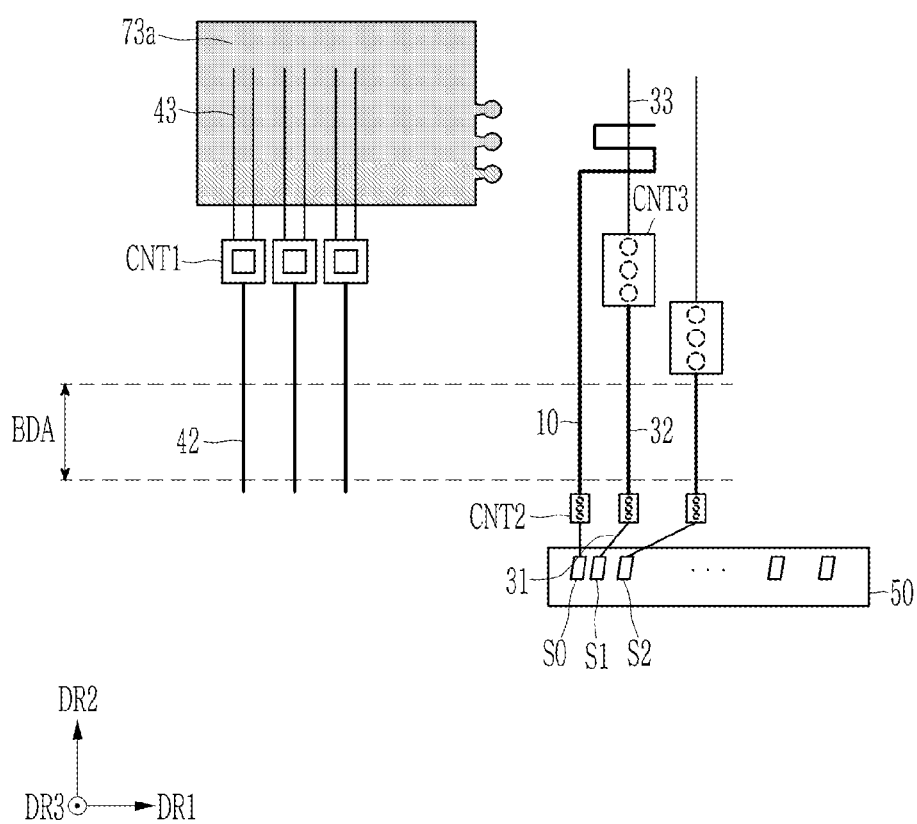

The embodiments of FIGS. 11 and 12 differ from the embodiment of FIG. 6 in that the sacrificial wire overlaps the data output wire and shields the data contact portion. A detailed description of the same configuration as that of the previous embodiment is omitted. The omitted configuration follows the description of the previous embodiment.

The sacrificial wire 10 may be disposed between the shielding portion 73a of the common voltage transfer line 70 and the contact portion CNT3 of the data output wire. The sacrificial wire 10 may be connected to the sacrificial terminal S0 of the data driver 50 through a contact portion CNT2, and may be disposed across the bending area BDA. The sacrificial terminal S0 may output the same voltage as an output value of the first terminal S1 applied to the data output wire 30, or may output a potential between a potential of the common voltage transfer line 70 and a potential of the data output wire 30. The sacrificial terminal S0 may copy a data voltage of the first terminal S1 adjacent to the sacrificial terminal S0 to output the copied data voltage.

An end portion of the sacrificial wire 10 is bent toward the third portion 33 of the data output wire to shield the data contact portion CNT3 of the data output wire adjacent to the sacrificial wire 10. The end portion of the sacrificial wire 10 may be bent at least once to shield the data contact portion CNT3 of the data output wire adjacent to the sacrificial wire 10. A portion of the sacrificial wire 10 may overlap the third portion 33 of the data output wire in a plan view, and may shield the data contact portion CNT3. A length, the number of times of bending, and a shape of the sacrificial wire may be variously changed.

In an embodiment, as shown in FIG. 11, the sacrificial wire 10 may cross the bending area BDA to extend along the second direction DR2, may be bent toward the third portion 33 of the data output wire to extend along the first direction DR1, and may shield the data contact portion CNT3, for example. In addition, as shown in FIG. 12, the sacrificial wire 10 may cross the bending area BDA to extend along the second direction DR2, then may be bent toward the third portion 33 of the data output wire to extend along first direction DR1, then may be bent and extended in the second direction DR2 again, then may be bent and extended in an opposite direction of the first direction DR1, then may be bent and extended in the second direction DR2 again, and then may be bent and extended in the first direction DR1 again to shield the data contact portion CNT3. In an embodiment, the second portion 42 and the third portion 43 of the touch wire 40 may be connected through a contact hole defined in a contact part CNT1.

Figure 13:
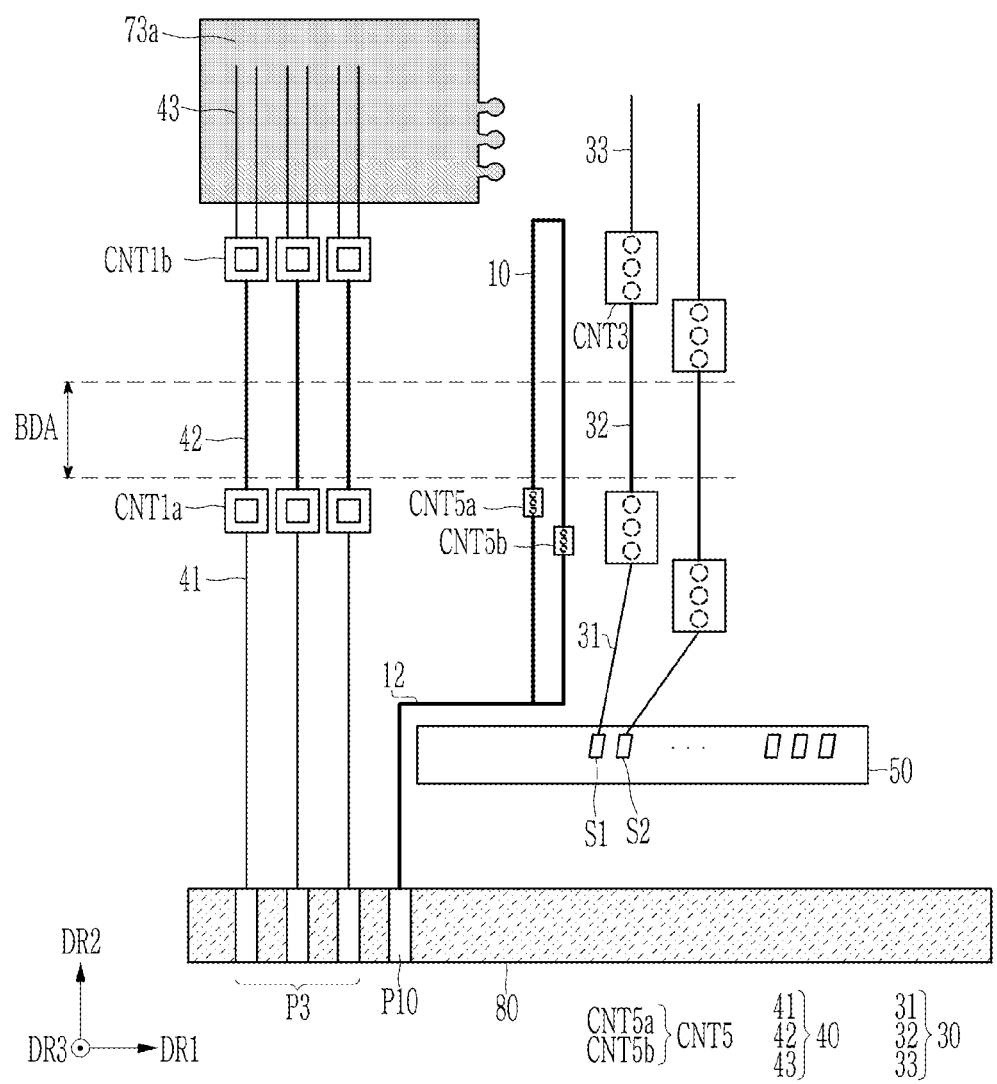
Figure 14:
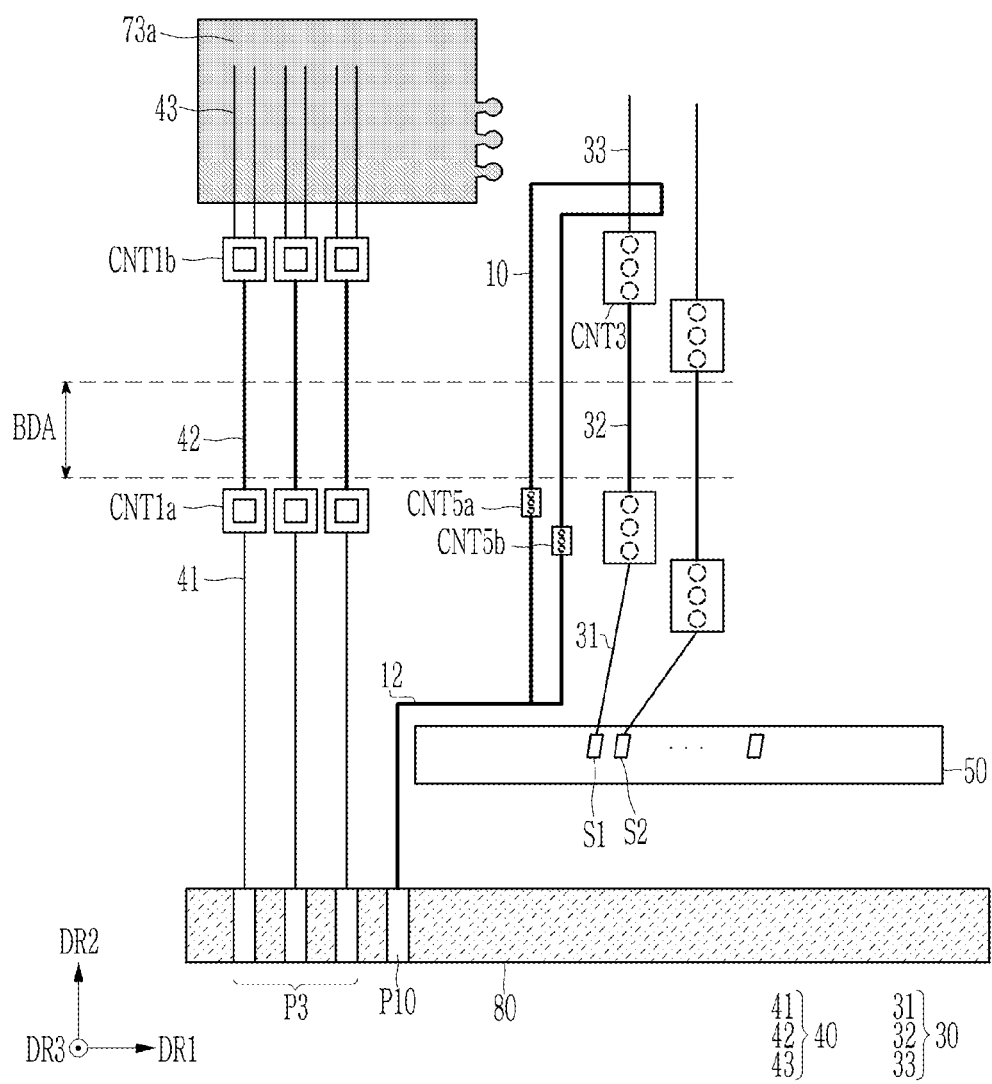

The embodiments of FIGS. 13 and 14 differ from the embodiment of FIG. 6 in that the sacrificial wire is connected to a terminal of the pad portion. The embodiment of FIG. 14 differs from the embodiment of FIG. 13 in that the sacrificial wire shields the data contact portion CNT3. A detailed description of the same configuration as that of the previous embodiment is omitted. The omitted configuration follows the description of the previous embodiment.

In the embodiments of FIGS. 6 to 12, the sacrificial wire 10 is connected to the sacrificial terminal S0 of the data driver 50, but in the illustrated embodiment, a high potential wire 12 of the pad portion 80 is utilized without providing a separate sacrificial terminal. That is, the sacrificial wire 10 may be connected to the high potential wire 12 connected to a terminal P10 of the pad portion 80. One end of the sacrificial wire 10 may be connected to the high potential wire 12 to receive a predetermined voltage, and the other end of the sacrificial wire 10 may not be connected to wires (e.g., the data line, the driving voltage line, or the like) disposed in the display area DA.

In an embodiment, the high potential wire 12 connected to the pad portion 80 may extend from the terminal P10 of the pad portion 80 toward the bending area BDA, and may be connected to the sacrificial wire 10 through contact portions CNT5a and CNT5b near the bending area BDA, for example. The high potential wire 12 may be formed as the first gate conductive layer or the second gate conductive layer, and may be connected to the sacrificial wire 10 formed as the first data conductive layer or the second data conductive layer through a contact portion CNT5. In an embodiment, the high potential wire 12 may be a wire that transfers a gate high voltage, a driving voltage, a ground voltage, or the like, for example.

The sacrificial wire 10 may be connected to the high potential wire 12 to receive a voltage (e.g., the gate high voltage, the driving voltage, the ground voltage, or the like) higher than the common voltage. Accordingly, a voltage difference between the common voltage transfer line 70 and the data output wire 30 may be reduced so that corrosion of the data output wire 30 including the data contact portion CNT3 is prevented or delayed.

Since the high potential wire 12 extending from the pad portion 80 is formed as the first gate conductive layer or the second gate conductive layer disposed below the first inter-insulating layer 161 that is an inorganic insulating layer, the high potential wire 12 may not be affected by corrosion of the sacrificial wire 10.

Referring to FIG. 13, the sacrificial wire 10 may be connected through the high potential wire 12 extending from the terminal P10 of the pad portion 80 and the contact portions CNT5a and CNT5b, and may be disposed across the bending area BDA. The sacrificial wire 10 may be disposed between the shielding portion 73a of the common voltage transfer line 70 and the data contact portion CNT3 of the data output wire 30. In an embodiment, the sacrificial wire 10 may be bent at least once to secure a sufficient length within a relatively small area. A length, the number of times of bending, and a shape of the sacrificial wire may be variously changed.

In an embodiment, one end of the sacrificial wire 10 connected to the contact portion CNT5a of the high potential wire 12 may cross the bending area BDA to extend along the second direction DR2, then may be bent and extended in the first direction DR1 toward the data output wire 30, and then may be bent and extended in an opposite direction of the second direction DR2, for example. The other end of the sacrificial wire 10 may be connected to the contact portion CNT5b of the high potential wire 12.

In an embodiment, the sacrificial wire 10 may be disposed to shield the data contact portion CNT3 of the data output wire 30. In an embodiment, referring to FIG. 14, one end of the sacrificial wire 10 connected to the contact portion CNT5a of the high potential wire 12 may cross the bending area BDA to extend along the second direction DR2, then may be bent and extended in the first direction DR1 toward the third portion 33 of the data output wire to shield the data contact portion CNT3, then may be bent and extended in an opposite direction of the second direction DR2, then may be bent and extended in an opposite direction of the first direction DR1, and then may be bent and extended in an opposite direction of the second direction DR2 again, for example. The other end of the sacrificial wire 10 may be connected to the contact portion CNT5b of the high potential wire 12. A portion of the sacrificial wire 10 may overlap the third portion 33 of the data output wire in a plan view, and may shield the data contact portion CNT3.

In FIGS. 13 and 14, both end portions of the sacrificial wire 10 are connected to the high potential wire 12 to define a closed curve, but in an embodiment, one end of the sacrificial wire 10 may be open.

Figure 15:
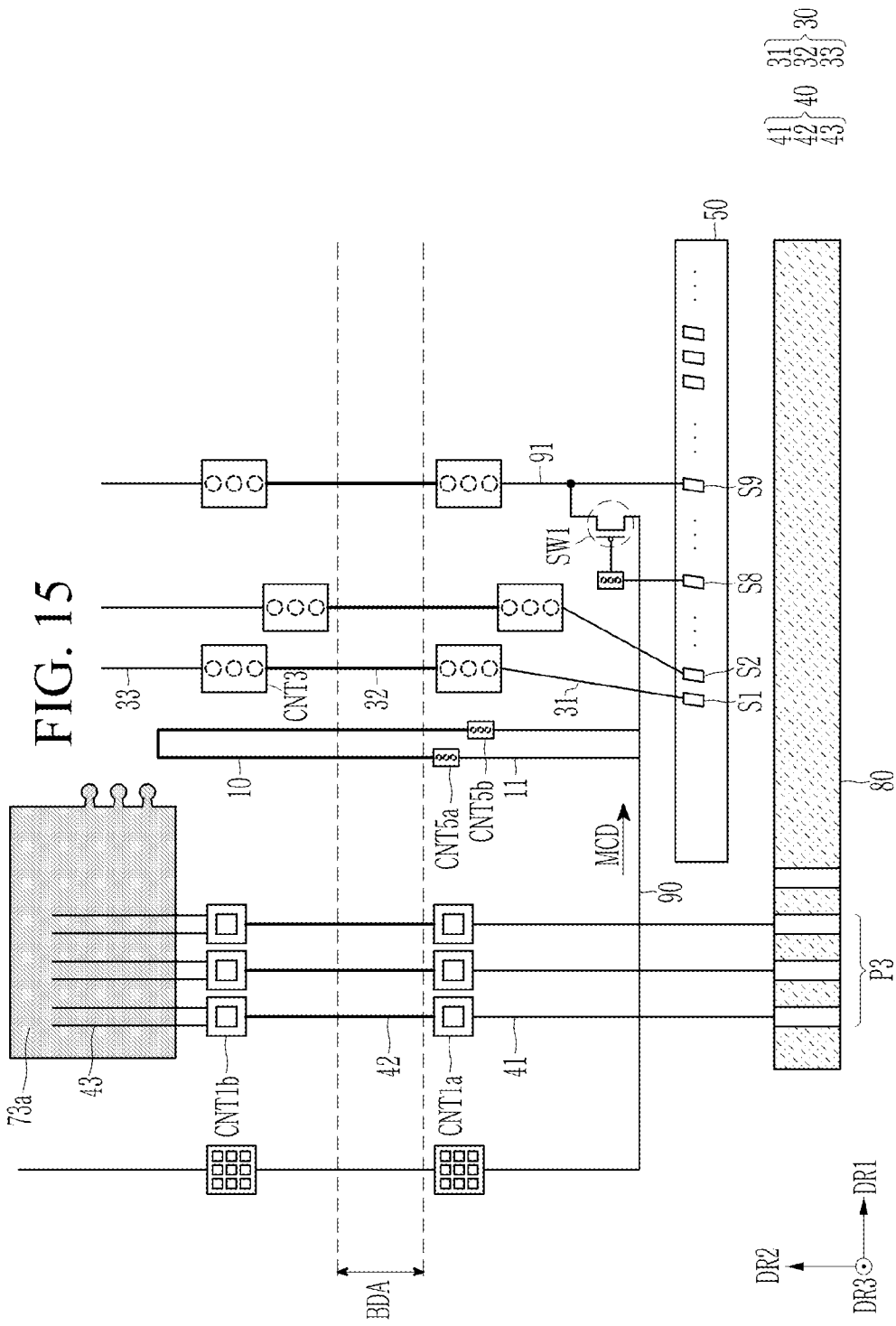
Figure 16:
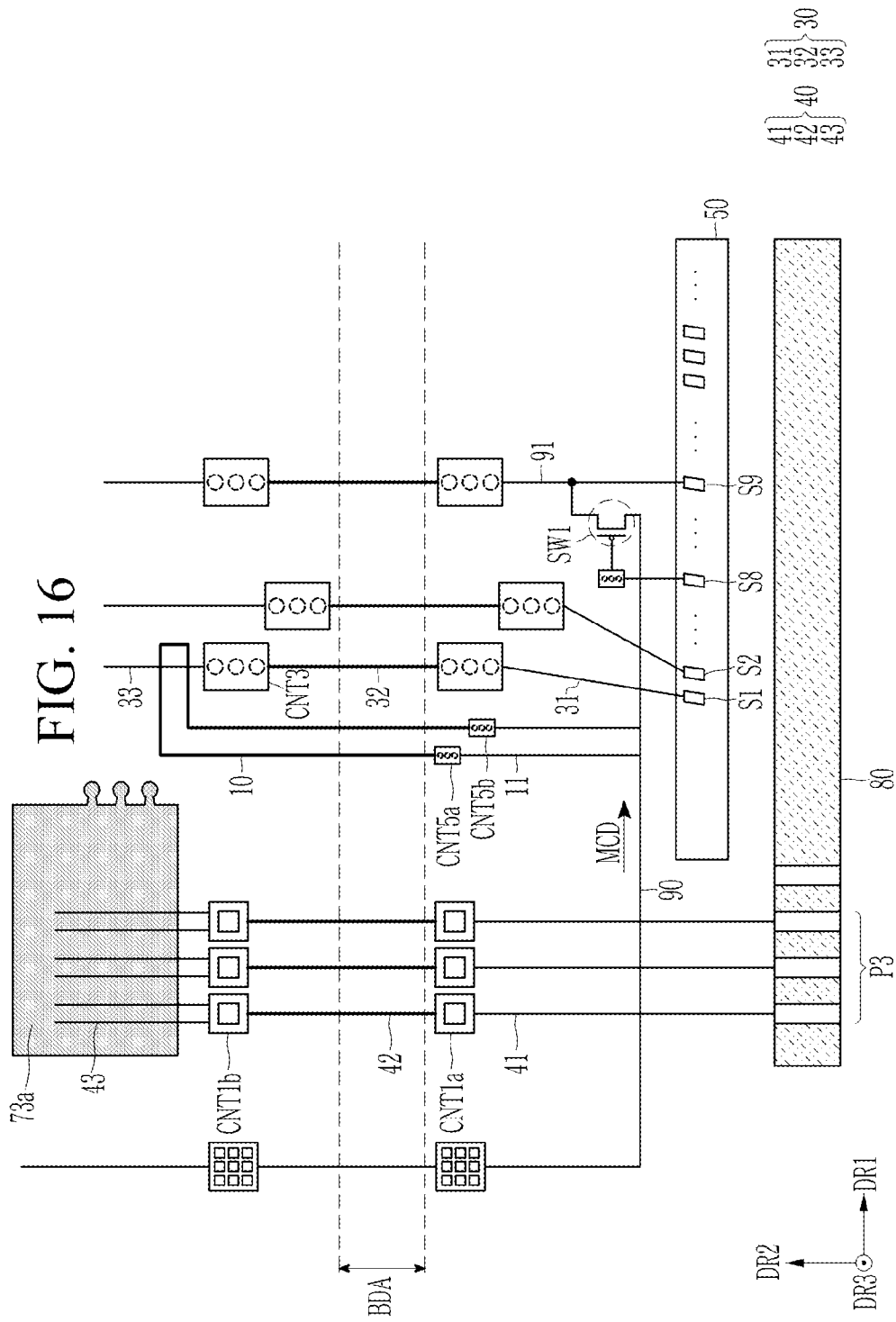

The embodiments of FIGS. 15 and 16 differ from the embodiment of FIG. 6 in that the sacrificial wire is connected to a crack detection line. The embodiment of FIG. 16 differs from the embodiment of FIG. 15 in that the sacrificial wire shields the data contact portion CNT3. A detailed description of the same configuration as that of the previous embodiment is omitted. The omitted configuration follows the description of the previous embodiment.

Referring to FIG. 15, the crack detection line 90 for detecting a crack of the display panel may be disposed between the bending area BDA and the data driver 50. In an embodiment, the crack detection line 90 may extend in the first direction DR1, and may be connected to a signal transfer wire 91, for example. The crack detection line 90 and the signal transfer wire 91 may be connected through a switching element SW1 turned on according to the gate signal. A gate electrode of the switching element SW1 may be connected to a terminal S8 of the data driver 50, a first electrode of the switching element SW1 may be connected to the crack detection line 90, and a second electrode of the switching element SW1 may be connected to the signal transfer wire 91.

The crack detection line 90 may transfer a crack detection voltage (also referred to as a crack sensing voltage) MCD detecting the crack of the display panel. The crack detection voltage MCD may be supplied through the crack detection line 90, and may be transferred to the signal transfer wire 91 through the switching element SW1. The signal transfer wire 91 may be connected to one or more data lines.

When a circuit is normally driven, an output voltage of a terminal S9 disposed in the data driver 50 may be applied to the signal transfer wire 91 to be transferred to the data line. When a test of the circuit is performed, the switching element SW1 may be turned on by a gate voltage output from the terminal S8, and the crack detection voltage MCD applied to the crack detection line 90 may be applied to the signal transfer wire 91 through the switching element SW1 to be transferred to the data line. The crack detection voltage MCD may be a relatively high potential voltage that causes the pixels PX connected to the data line to display the highest gray scale.

Referring to FIG. 15, the sacrificial wire 10 may be connected to the crack detection line 90 through the contact portions CNT5a and CNT5b, and may be disposed to cross the bending area BDA. One end of the sacrificial wire 10 may be connected to the crack detection line 90 to receive the crack detection voltage MCD, and the other end of the sacrificial wire 10 may not be connected to wires (e.g., the data line, the driving voltage line, or the like) disposed in the display area DA.

The sacrificial wire 10 may be disposed between the shielding portion 73a of the common voltage transfer line 70 and the data contact portion CNT3 of the data output wire 30. In an embodiment, the sacrificial wire 10 may be bent at least once to secure a sufficient length within a relatively small area.

Referring to FIG. 16, the sacrificial wire 10 may be bent at least once toward the third portion 33 of the data output wire adjacent to the sacrificial wire 10 to shield the data contact portion CNT3. A portion of the sacrificial wire 10 may overlap the third portion 33 of the data output wire in a plan view, and may shield the data contact portion CNT3.

In FIGS. 15 and 16, both end portions of the sacrificial wire 10 are connected to the crack detection line 90 via a wire 11 to define a closed curve, but in an embodiment, one end of the sacrificial wire 10 may be open. A length, the number of times of bending, and a shape of the sacrificial wire may be variously changed.

The sacrificial wire 10 may be connected to the crack detection line 90 to receive the crack detection voltage MCD so that a voltage difference between the common voltage transfer line 70 and the data output wire 30 is reduced. Thus, corrosion of the data output wire 30 including the data contact portion CNT3 may be prevented or delayed.

Figure 17:
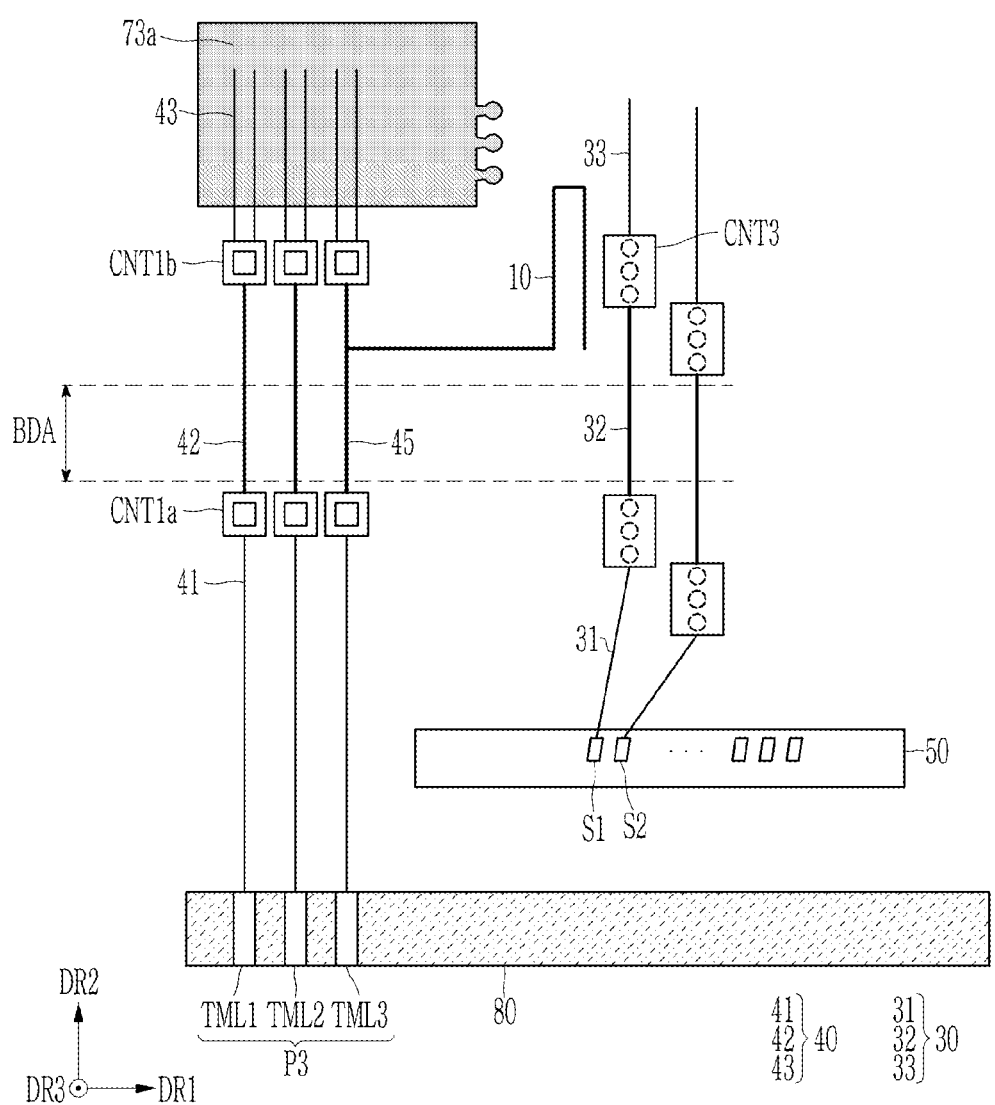
Figure 18:
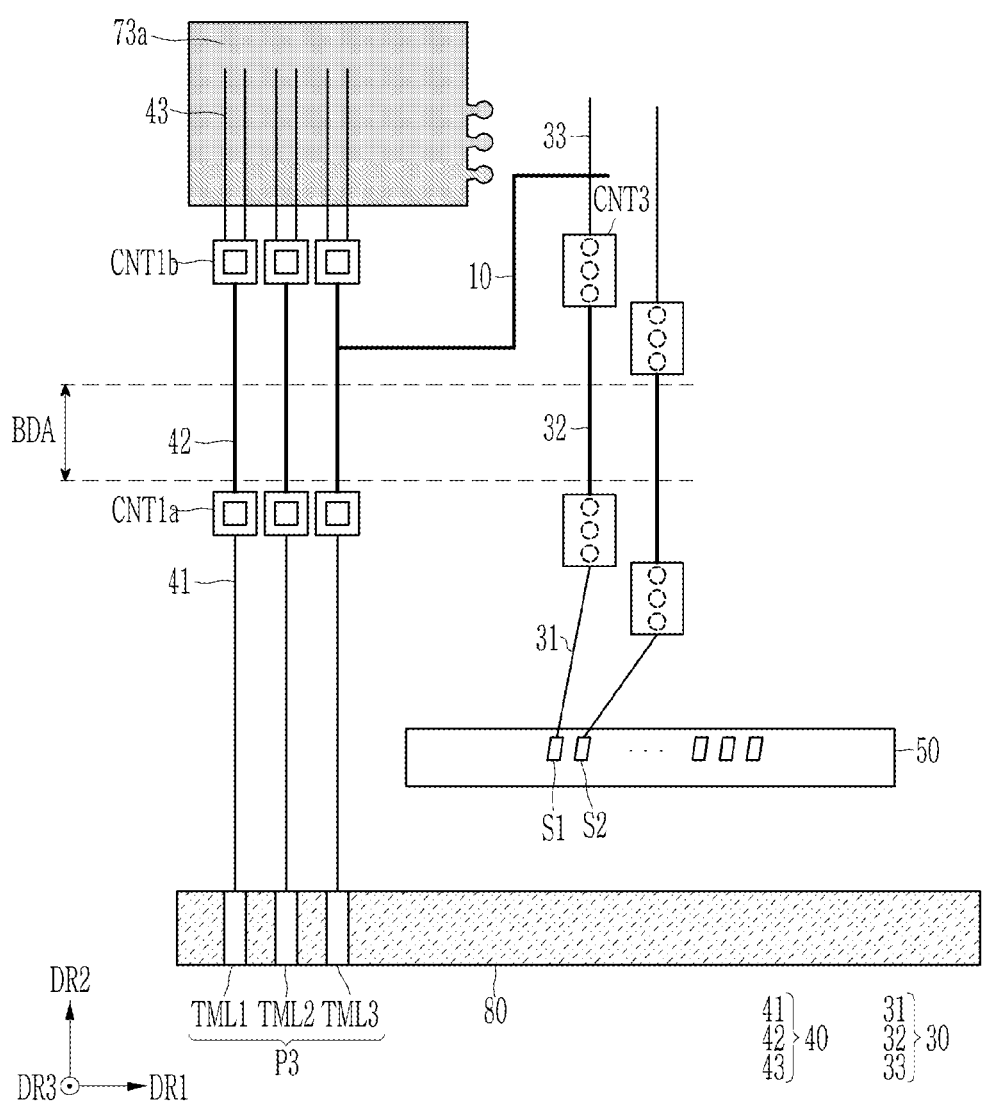

The embodiments of FIGS. 17 and 18 differ from the embodiment of FIG. 6 in that the sacrificial wire is connected to a portion of the touch wire. The embodiment of FIG. 18 differs from the embodiment of FIG. 17 in that the sacrificial wire shields the data contact portion CNT3. A detailed description of the same configuration as that of the previous embodiment is omitted. The omitted configuration follows the description of the previous embodiment.

Referring to FIG. 17, touch wires 40 connected to the terminal P3 of the pad portion 80 and extended in the second direction DR2 to be connected to the touch sensor layer are disposed. The touch wires 40 may be disposed approximately in parallel in the second direction DR2, and one of the touch wires 40 may be a ground wire 45 having a voltage of about 0 V. From a viewpoint of preventing electro-static discharge ("ESD") of the touch sensor layer, the ground wire 45 may be disposed around the display panel to achieve a purpose of releasing static electricity. The ground wire 45 may be disposed surrounding at least a portion of the display area including the touch sensor TE. The ground wire 45 may not be connected to the touch sensor TE of the display area.

Referring to FIG. 17, one end of the sacrificial wire 10 may be connected to the ground wire 45 among the touch wires. The ground wire 45 may be connected to a ground terminal TML3 of the pad portion 80 to receive a ground voltage. One end of the sacrificial wire 10 may be connected to the ground wire 45 to receive the ground voltage. The other end of the sacrificial wire 10 may not be connected to wires (e.g., the data line, the driving voltage line, or the like) disposed in the display area DA. In an embodiment, a second portion 42 may be connected to a terminal TML1 or TML2 of the pad portion 80 via a first portion 41.

The sacrificial wire 10 may extend toward the data output wire 30 along the first direction DR1, and then may be bent in the second direction DR2 to be disposed between the shielding portion 73a of the common voltage transfer line 70 and the contact portion CNT3 of the data output wire 30. In an embodiment, the sacrificial wire 10 may be bent at least once to secure a sufficient length within a relatively small area. A length, the number of times of bending, and a shape of the sacrificial wire may be variously changed.

In the embodiment of FIG. 18, one end of the sacrificial wire 10 may be connected to the ground wire 45. The other end of the sacrificial wire 10 may extend toward the data output wire 30 along the first direction DR1, then may be bent and extended in the second direction DR2, and then may be bent and extended in the first direction DR1 again to be disposed to shield the data contact portion CNT3 of the data output wire 30 adjacent to the sacrificial wire 10. A portion of the sacrificial wire 10 may overlap the third portion 33 of the data output wire in a plan view, and may shield the data contact portion CNT3.

The sacrificial wire 10 may be connected to the ground wire 45 to apply a ground voltage (about 0 V) that is a value between the common voltage and the data voltage so that a voltage difference between the common voltage transfer line 70 and the data output wire 30 is reduced. Thus, corrosion of the data output wire 30 including the data contact portion CNT3 may be prevented or delayed.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A display device comprising:
   a substrate including a display area in which pixels are disposed and a non-display area;
   a common voltage transfer line which is disposed in the non-display area and transfers a common voltage to the pixels;
   a data output wire disposed in the non-display area and connected to a data line which transfers a data voltage to the pixels; and
   a sacrificial wire disposed between the common voltage transfer line and the data output wire and not connected to the data line; and
   a data driver disposed in the non-display area,
   wherein the data driver comprises:
     a first terminal which outputs the data voltage; and
     a sacrificial terminal which applies a predetermined voltage to the sacrificial wire,
   wherein the non-display area includes a bending area,
   wherein the data output wire includes a first portion extending from the data driver toward the bending area, a second portion connected to the first portion and passing through the bending area, a third portion connected to the second portion and extending toward the display area, and a data contact portion electrically connecting the second portion and the third portion,
   wherein a first end of the sacrificial wire is connected to the sacrificial terminal, a second end of the sacrificial wire includes a sacrificial contact portion, and
   wherein the sacrificial contact portion includes a dummy wire overlapping the second end of the sacrificial wire and a dummy connection electrode connecting the second end of the sacrificial wire and the dummy wire.

2. The display device of claim 1, wherein the sacrificial terminal applies a voltage which is higher than the common voltage and is lower than or equal to the data voltage.

3. The display device of claim 1, wherein the sacrificial wire extends from the sacrificial terminal toward the bending area, is bent toward the data output wire and shields the data contact portion.

4. The display device of claim 1, wherein the sacrificial wire is bent at least once.

5. The display device of claim 1, wherein the sacrificial wire is disposed in a same layer as the common voltage transfer line, or an organic layer is disposed between the sacrificial wire and the common voltage transfer line.

6. A display device comprising:
   a substrate including a display area in which pixels are disposed and a non-display area;
   a common voltage transfer line which is disposed in the non-display area and transfers a common voltage to the pixels;
   a data output wire disposed in the non-display area and connected to a data line which transfers a data voltage to the pixels;
   a pad portion disposed in the non-display area and including:
     a first terminal which outputs the common voltage; and
     a second terminal which outputs a voltage higher than the common voltage;
   a sacrificial wire disposed between the common voltage transfer line and the data output wire, connected to the pad portion, and not connected to the data line; and
   a data driver disposed in the non-display area,
   wherein the data driver comprises:
     a first terminal which outputs the data voltage; and
     a sacrificial terminal which applies a predetermined voltage to the sacrificial wire,
   wherein the non-display area includes a bending area,
   wherein the data output wire includes a first portion extending from the data driver toward the bending area, a second portion connected to the first portion and passing through the bending area, a third portion connected to the second portion and extending toward the display area, and a data contact portion electrically connecting the second portion and the third portion,
   wherein a first end of the sacrificial wire is connected to the sacrificial terminal, a second end of the sacrificial wire includes a sacrificial contact portion, and
   wherein the sacrificial contact portion includes a dummy wire overlapping the second end of the sacrificial wire and a dummy connection electrode connecting the second end of the sacrificial wire and the dummy wire.

7. The display device of claim 6, further comprising a high potential wire extending from the second terminal and connected to the sacrificial wire,
   wherein the second terminal outputs at least one of a gate high voltage, a driving voltage, and a ground voltage to the high potential wire.

8. The display device of claim 6,
   wherein the sacrificial wire extends toward the bending area, is bent toward the data output wire and shields the data contact portion.

9. The display device of claim 6, wherein the sacrificial wire includes a shape bent at least once.

10. The display device of claim 6, wherein the sacrificial wire is disposed in a same layer as the common voltage transfer line, or an organic layer is disposed between the sacrificial wire and the common voltage transfer line.

11. A display device comprising:
    a substrate including a display area in which pixels are disposed and a non-display area;
    a common voltage transfer line which is disposed at the non-display area and transfers a common voltage to the pixels;
    a data output wire disposed in the non-display area and connected to a data line which transfers a data voltage to the pixels;
    a crack detection line which is disposed in the non-display area and transfers a crack detection voltage;
    a sacrificial wire disposed between the common voltage transfer line and the data output wire, connected to the crack detection line, and not connected to the data line; and
    a data driver disposed in the non-display area,
    wherein the non-display area includes a bending area,
    wherein the data output wire includes a first portion extending from the data driver toward the bending area, a second portion connected to the first portion and passing through the bending area, a third portion connected to the second portion and extending toward the display area, and a data contact portion electrically connecting the second portion and the third portion, and wherein the sacrificial wire extends from the crack detection line toward the bending area, is bent toward the data output wire and shields the data contact portion.

12. The display device of claim 11, wherein the sacrificial wire is bent at least once.

13. The display device of claim 11, wherein the sacrificial wire is disposed in a same layer as the common voltage transfer line, or an organic layer is disposed between the sacrificial wire and the common voltage transfer line.

14. A display device comprising:
- a substrate including a display area in which pixels are disposed and a non-display area;
- a common voltage transfer line which is disposed in the non-display area and transfers a common voltage to the pixels;
- a data output wire disposed in the non-display area and connected to a data line which transfers a data voltage to the pixels;
- touch wires disposed in the non-display area and including a ground wire; and
- a sacrificial wire connected to the ground wire and not connected to the data line;
- a data driver disposed in the non-display area, wherein the ground wire extends parallel to a touch wire of the touch wires adjacent to the ground wire and is not connected to a touch sensor disposed in the display area, wherein the non-display area includes a bending area, wherein the data output wire includes a first portion extending from the data driver toward the bending area, a second portion connected to the first portion and passing through the bending area, a third portion connected to the second portion and extending toward the display area, and a data contact portion electrically connecting the second portion and the third portion, and wherein a first end of the sacrificial wire is connected to the ground wire, and ta second end of the sacrificial wire shields the data contact portion.

15. The display device of claim 14, wherein the sacrificial wire is disposed in a same layer as the common voltage transfer line, or an organic layer is disposed between the sacrificial wire and the common voltage transfer line.

* * * * *